(12) United States Patent
Murase et al.

(10) Patent No.: US 12,709,021 B2
(45) Date of Patent: Aug. 18, 2026

(54) HAND, ROBOT SYSTEM, AND CONTROL METHOD OF HAND

(71) Applicant: KAWASAKI JUKOGYO KABUSHIKI KAISHA, Kobe (JP)

(72) Inventors: Yohei Murase, Kobe (JP); Takeshi Matsuura, Kobe (JP); Tamami Oryu, Kobe (JP); Hisao Wada, Kobe (JP); Hiroaki Fukuda, Kobe (JP)

(73) Assignee: KAWASAKI JUKOGYO KABUSHIKI KAISHA, Kobe (JP)

( * ) Notice: Subject to any disclaimer, the term of this patent is extended or adjusted under 35 U.S.C. 154(b) by 754 days.

(21) Appl. No.: 18/034,106

(22) PCT Filed: Oct. 5, 2021

(86) PCT No.: PCT/JP2021/036880
§ 371 (c)(1),
(2) Date: Apr. 27, 2023

(87) PCT Pub. No.: WO2022/097410
PCT Pub. Date: May 12, 2022

(65) Prior Publication Data

US 2023/0381975 A1 Nov. 30, 2023

(30) Foreign Application Priority Data

Nov. 4, 2020 (JP) ................................ 2020-184709

(51) Int. Cl.
*B25J 15/00* (2006.01)
*B25J 15/02* (2006.01)
(Continued)

(52) U.S. Cl.
CPC ....... *B25J 15/0266* (2013.01); *B25J 15/0052* (2013.01); *B25J 19/0091* (2013.01); *B25J 9/1612* (2013.01); *B25J 15/026* (2013.01)

(58) Field of Classification Search
CPC ................ B25J 15/0266; B25J 15/0052; B25J 19/0091; B25J 9/1612; B25J 15/026
(Continued)

(56) References Cited

U.S. PATENT DOCUMENTS 4,696,501 A * 9/1987 Webb ..................... B25J 13/082 414/730
10,286,549 B2 * 5/2019 Kilibarda ............ B25J 15/0475
(Continued)

FOREIGN PATENT DOCUMENTS

CN 106181972 A 12/2016
CN 109048305 A 12/2018
(Continued)

*Primary Examiner* — Jacob A Smith
(74) *Attorney, Agent, or Firm* — XSENSUS LLP

(57) ABSTRACT

A second hand H2 that couples a first workpiece to a second workpiece, where the first and second workpieces are to be coupled to each other by insertion coupling, includes: a second gripper 5 that grips the first workpiece; a straight-moving actuator 6 that moves the second gripper 5 straight in the direction of a predetermined axis E; and a rotation actuator 7 that rotates the second gripper 5 about the axis E. The second gripper 5 includes three second fingers 51 that grip the first workpiece, and a linkage 52 that opens and closes the three second fingers 51.

17 Claims, 24 Drawing Sheets

(51) Int. Cl.
*B25J 19/00* (2006.01)
*B25J 9/16* (2006.01)

(58) Field of Classification Search
USPC ........................................................ 294/86.4
See application file for complete search history.

(56) References Cited

U.S. PATENT DOCUMENTS

2014/0125080 A1* 5/2014 Dan ..................... B25J 15/0028
901/41
2022/0176572 A1* 6/2022 Gross ................... B25J 15/0441

FOREIGN PATENT DOCUMENTS

| | | | |
|---|---|---|---|
| CN | 111168351 | A | 5/2020 |
| JP | S58-160028 | A | 9/1983 |
| JP | S60-029086 | U | 2/1985 |
| JP | S63-089232 | A | 4/1988 |
| JP | H03-065687 | U | 6/1991 |
| JP | H05-285747 | A | 11/1993 |
| JP | H10-076492 | A | 3/1998 |
| JP | 2012-139776 | A | 7/2012 |

* cited by examiner

FIG. 32
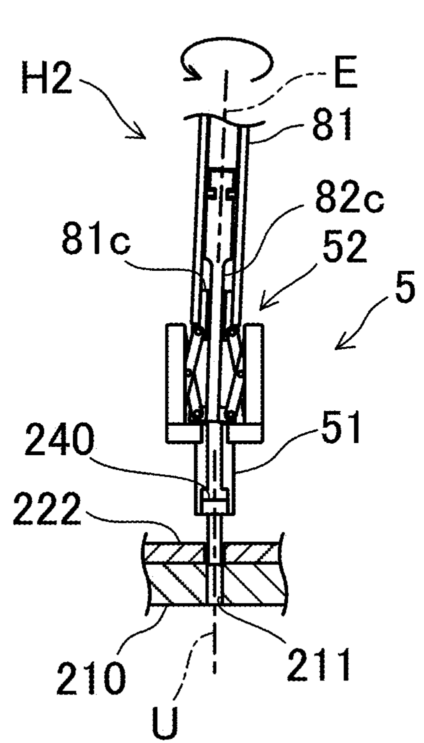
FIG. 33
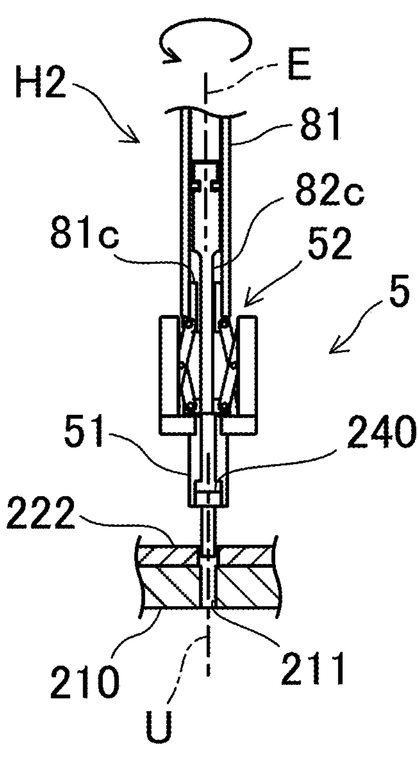

HAND, ROBOT SYSTEM, AND CONTROL METHOD OF HAND

CROSS-REFERENCE TO RELATED APPLICATIONS

The present application is based on PCT filing PCT/JP2021/036880, filed Oct. 5, 2021, which claims priority to JP 2020-184709, filed Nov. 4, 2020, the entire contents of each are incorporated herein by reference.

FIELD

The present disclosure relates to a hand, a robot system, and a control method of a hand.

BACKGROUND

A hand known to date performs work of inserting a workpiece in a hole. Patent Document 1, for example, discloses a technique in which a hand grips a workpiece and the workpiece gripped by the hand is inserted in a hole. In Patent Document 1, the hand grips the workpiece vertically so that no moment is exerted on the workpiece by self weight. This eases alignment of axes between the workpiece and the hole.

CITATION LIST

Patent Document

Patent Document 1: Japanese Patent Application Publication No. H05-285747

SUMMARY

Technical Problem

For two workpieces to be coupled to each other by insertion as in the work of inserting a workpiece in a hole, in the work of coupling one of the two workpieces to the other workpiece, if the axes of these two workpieces are displaced from each other, it is difficult to couple the two workpieces by insertion. In view of this, as proposed in Patent Document 1, a method is devised to accurately perform axis alignment of the two workpieces.

In the hand of Patent Document 1, however, axis alignment needs to be performed accurately between the workpiece and the hole in the horizontal direction. The hand of Patent Document 1 has the problem that accurate axis alignment between the workpiece and the hole is limited to a configuration in which the workpiece is held vertically.

In the manner described above, to smoothly couple one of two workpieces to be coupled to each other by insertion to the other workpiece by a hand, there is still room for improvement.

It is therefore an object of the present disclosure to smoothly couple a workpiece to another workpiece by a hand for insertion coupling of these workpieces.

A hand according to the present disclosure is a gripper that grips a first workpiece and couples the first workpiece to a second workpiece, the first workpiece and the second workpiece being to be coupled to each other by insertion, and the hand includes: a gripper that grips the first workpiece; a straight-moving actuator that causes the gripper to move straight in a direction of a predetermined axis; and a rotation actuator that rotates the gripper about the axis, wherein the gripper includes at least two fingers that grip the first workpiece and a linkage that opens and closes the at least two fingers.

The "insertion coupling" herein includes both fitting and screwing. The "first workpiece" may be an outer workpiece or an inner workpiece in two workpieces to be coupled to each other by fitting or screwing.

With this configuration, at least two fingers gripping the first workpiece move straight in the direction of the axis while rotating about the axis to thereby couple the first workpiece to the second workpiece. The at least two fingers are opened and closed by the linkage. The linkage includes movable portions and sliding portions. A clearance unique to the linkage enables the gripper to adjust tilt or eccentricity of the first workpiece with respect to the second workpiece, albeit to some extent. With a combination of rotation of the first workpiece about the axis and the adjustment function of tilt and eccentricity by the linkage, the first workpiece can be smoothly coupled to the second workpiece with the axes of the first workpiece and the second workpiece coinciding with each other.

A robot system according to the present disclosure is a robot system that couples a first workpiece to a second workpiece, the first workpiece and the second workpiece being to be coupled to each other by insertion, and includes: a hand; and a controller that controls the hand, wherein the hand includes a gripper that grips the first workpiece, a straight-moving actuator that moves the gripper straight in a direction of a predetermined axis, and a rotation actuator that rotates the gripper about the axis, the gripper includes at least two fingers that grip the first workpiece and a linkage that opens and closes the at least two fingers, and the controller moves the gripper gripping the first workpiece straight in the direction of the axis by the straight-moving actuator while rotating the gripper about the axis by the rotation actuator, thereby performing rotational coupling of coupling the first workpiece to the second workpiece.

With this configuration, at least two fingers gripping the first workpiece move straight in the direction of the axis while rotating about the axis to thereby couple the first workpiece to the second workpiece. The at least two fingers are opened and closed by the linkage. The linkage includes movable portions and sliding portions. A clearance unique to the linkage enables the gripper to adjust tilt or eccentricity of the first workpiece with respect to the second workpiece, albeit to some extent. With a combination of rotation of the first workpiece about the axis and the adjustment function of tilt and eccentricity by the linkage, the first workpiece can be smoothly coupled to the second workpiece with the axes of the first workpiece and the second workpiece coinciding with each other.

A control method of a hand according to the present disclosure is a control method of the hand including at least two fingers that grip a workpiece and a linkage that opens and closes the at least two fingers, and the control method includes: gripping a first workpiece by the gripper, the first workpiece being to be coupled to a second workpiece by insertion coupling; rotating the gripper gripping the first workpiece about a predetermined axis; and moving the gripper rotating about the axis straight in the direction of the axis, thereby performing rotational coupling of coupling the first workpiece to the second workpiece.

With this configuration, at least two fingers gripping the first workpiece move straight in the direction of the axis while rotating about the axis to thereby couple the first workpiece to the second workpiece. The at least two fingers are opened and closed by the linkage. The linkage includes movable portions and sliding portions. A clearance unique to the linkage enables the gripper to adjust tilt or eccentricity of the first workpiece with respect to the second workpiece, albeit to some extent. With a combination of rotation of the first workpiece about the axis and the adjustment function of tilt and eccentricity by the linkage, the first workpiece can be smoothly coupled to the second workpiece with the axes of the first workpiece and the second workpiece coinciding with each other.

The hand described above can smoothly couple one of workpieces to be coupled to each other by insertion, to the other workpiece.

With the robot system described above, one of workpieces to be coupled to each other by insertion can be can smoothly coupled to the other workpiece by the hand.

With the control method of the hand described above, one of workpieces to be coupled to each other by insertion can be can smoothly coupled to the other workpiece by the hand.

BRIEF DESCRIPTION OF THE DRAWINGS

FIG. 5 is a cross-sectional view of a first hand taken along line V-V in FIG.

FIG. 32 is a cross-sectional view of the second gripper illustrating a state where tilt of the axis of the bolt is adjusted.

FIG. 33 is a cross-sectional view of the second gripper illustrating a state where axis eccentricity of the bolt is adjusted.

DESCRIPTION OF EMBODIMENTS

An exemplary embodiment will be described in detail hereinafter with reference to the drawings.

Figure 1:
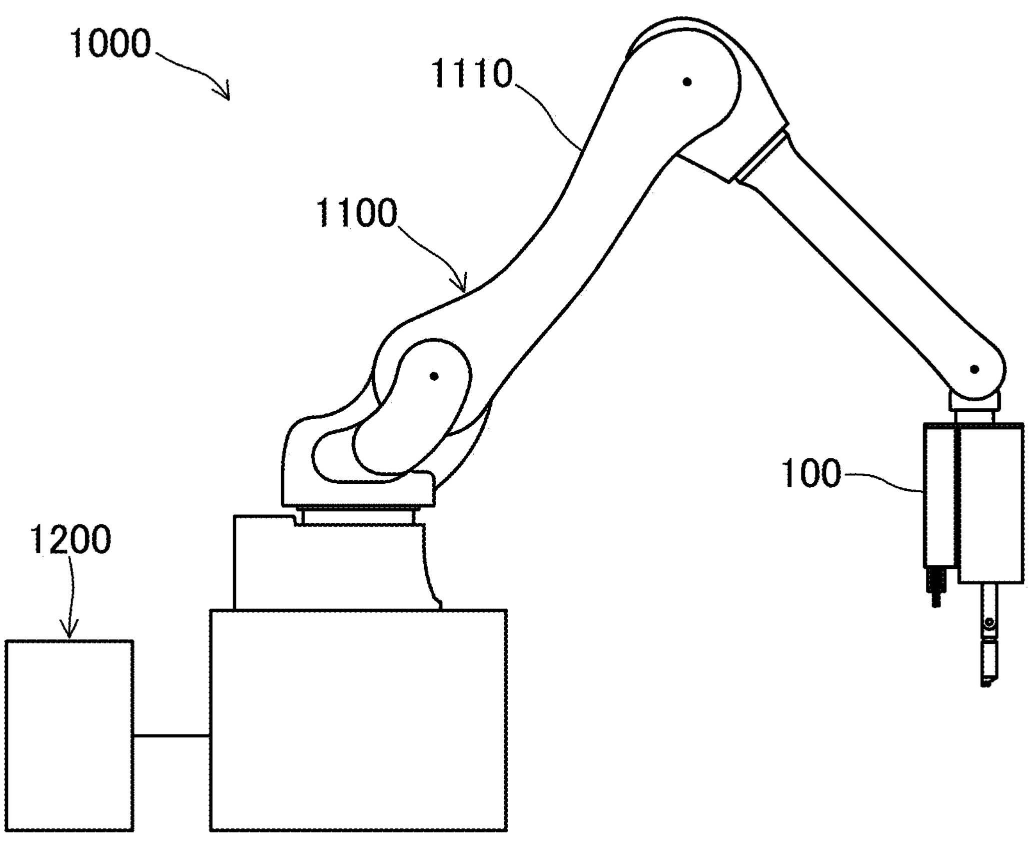
FIG. 1 is a schematic view illustrating a configuration of a robot system.

FIG. 1 is a schematic view illustrating a configuration of a robot system 1000.

The robot system 1000 includes a robot 1100 and a controller 1200 that controls the robot 1100.

The robot 1100 is, for example, an industrial robot. The robot 1100 includes a robot arm 1110 and a hand 100 coupled to the distal end of the robot arm 1110. The robot 1100 operates, that is, moves the hand 100 by the robot arm 1110. The hand 100 is a so-called end effector. The hand 100 grips a workpiece W. The hand 100 also adjusts gripping of the workpiece W and/or combines the workpiece W to another workpiece, for example.

Figure 2:
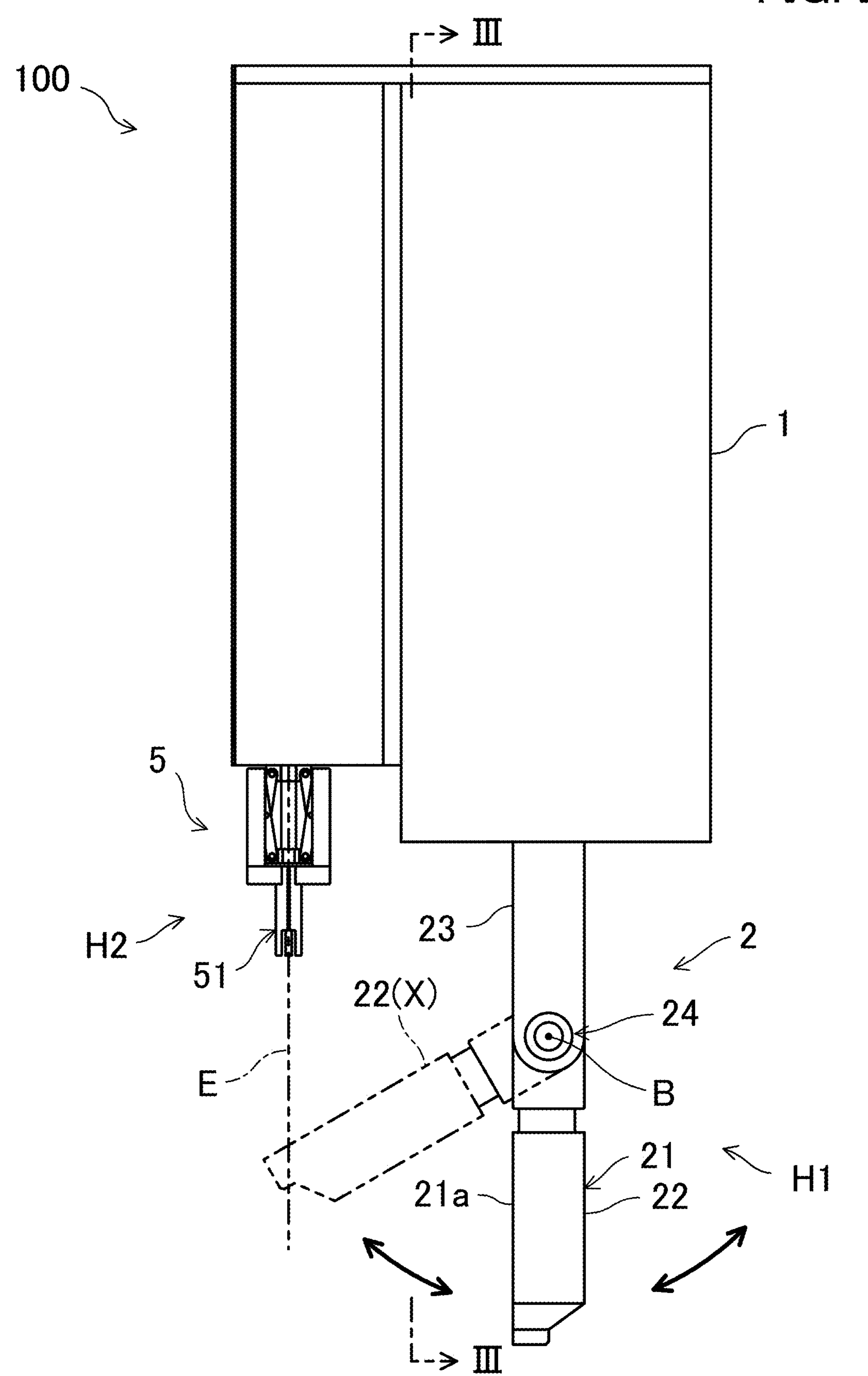
FIG. 2 is a front view of a hand.

FIG. 2 is a front view of the hand 100. The hand 100 includes a first hand H1 and a second hand H2. The first hand H1 and the second hand H2 are disposed on a common base 1. The first hand H1 and the second hand H2 can execute a treatment individually or in cooperation. Examples of the individual treatment include a treatment in which the first hand H1 or the second hand H2 grips a workpiece. Examples of the cooperative treatment include a treatment in which the first hand H1 delivers a workpiece to the second hand H2 and a treatment in which the first hand H1 and the second hand H2 grip a workpiece.

=First Hand=

The first hand H1 includes the base 1 and a first gripper 2 disposed on the base 1. The first hand H1 performs various treatments on a workpiece by the first gripper 2.

Figure 3:
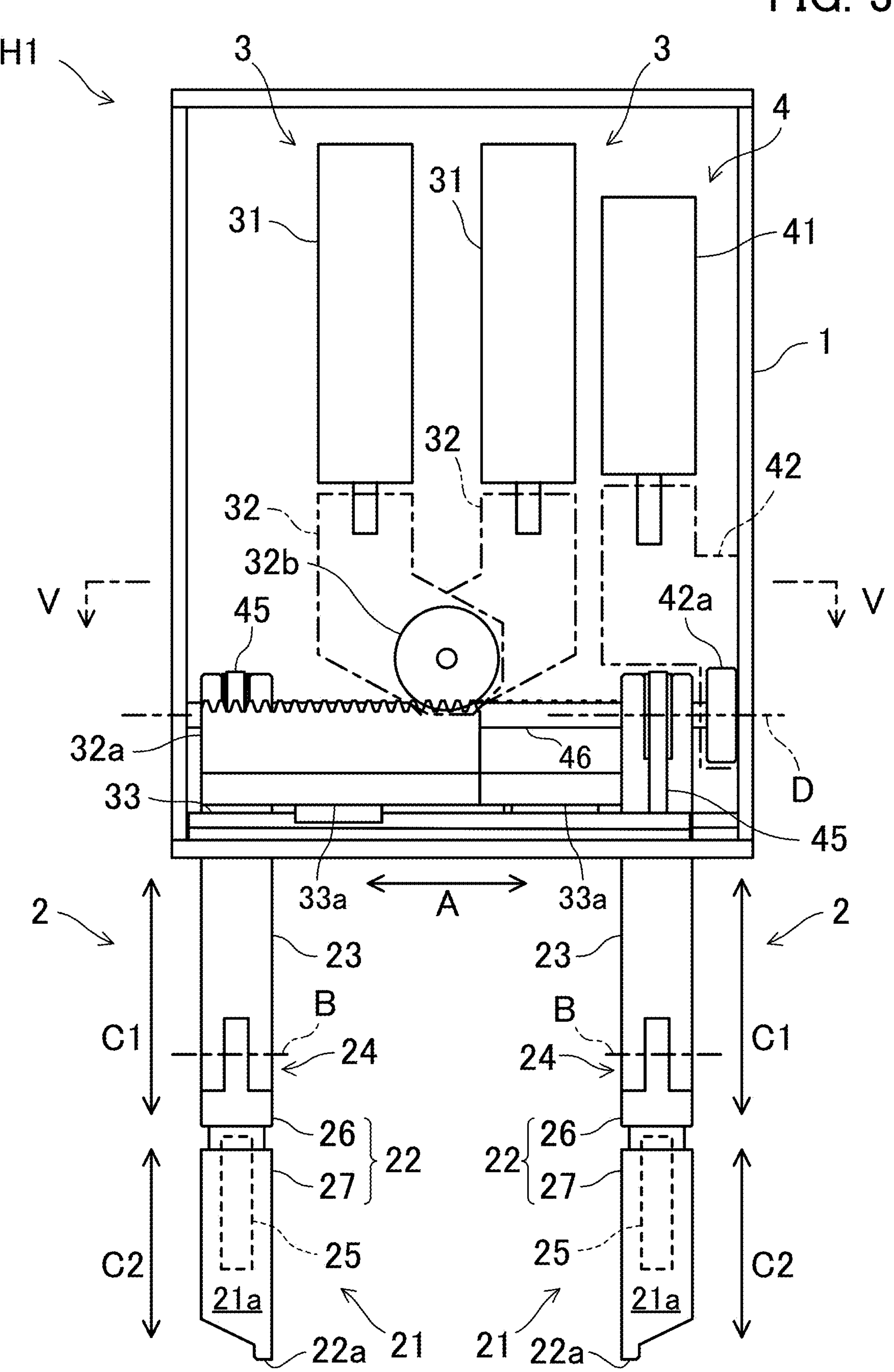
FIG. 3 is a cross-sectional view of the hand taken along line in FIG. 2.

FIG. 3 is a cross-sectional view of the hand 100 taken along line in FIG. 2. Specifically, FIG. 3 is a view of the first hand H1 seen from the second hand H2, while showing the inside of the base 1. In FIG. 3, an internal configuration of the base 1 is schematically shown.

The first gripper 2 includes two first fingers 21 extending from the base 1, opening/closing actuators 3 that open and close the two first fingers 21 in predetermined opening/closing directions A, and a bending actuator 4 that bends the two first fingers 21. Each of the first fingers 21 includes a damper 25 that absorbs shock on the first finger 21.

The two first fingers 21 moves toward or away from each other in the opening/closing directions A by the opening/closing actuators 3. Accordingly, the two first fingers 21 grips a workpiece and release gripping of the workpiece. In this example, the opening/closing actuator 3 cause the two first fingers 21 to operate individually. That is, the first hand H1 includes two opening/closing actuators 3 respectively associated with the two first fingers 21. The two first fingers 21 are bendable by the bending actuator 4. The bending actuator 4 causes the two first fingers 21 to operate simultaneously. The first hand H1 includes one bending actuator 4 common to the two first fingers 21. The opening/closing actuators 3 and the bending actuator 4 are disposed on the base 1.

—First Finger—

As illustrated in FIGS. 2 and 3, each of the first fingers 21 includes a first part 22 at the distal end and the second part 23 at the base 1. The first part 22 and the second part 23 are coupled to each other by a joint 24. The first part 22 rotates about a rotation axis B parallel to the opening/closing directions A through the joint 24. Accordingly, the first finger 21 changes to a bent state where the first part 22 is bent with respect to the second part 23 and an extended state where the first part 22 and the second part 23 are extended in a straight line.

The second part 23 is coupled to the base 1. The second part 23 extends from the base 1 in extension directions C1 orthogonal to the opening/closing directions A. The joint 24 is disposed at the distal end of the second part 23.

The first part 22 includes a fixer 26 and a mover 27. The fixer 26 and the mover 27 are aligned in a straight line and extend in extension directions C2. The fixer 26 is coupled to the joint 24. The mover 27 is coupled to the fixer 26 through the damper 25 to be movable in the extension directions C2. A surface of the mover 27 facing the second hand H2 in the extended state of the first finger 21 is a support surface 21*a* that supports a workpiece when the first hand H1 delivers the workpiece to the second hand H2, for example.

Figure 4:
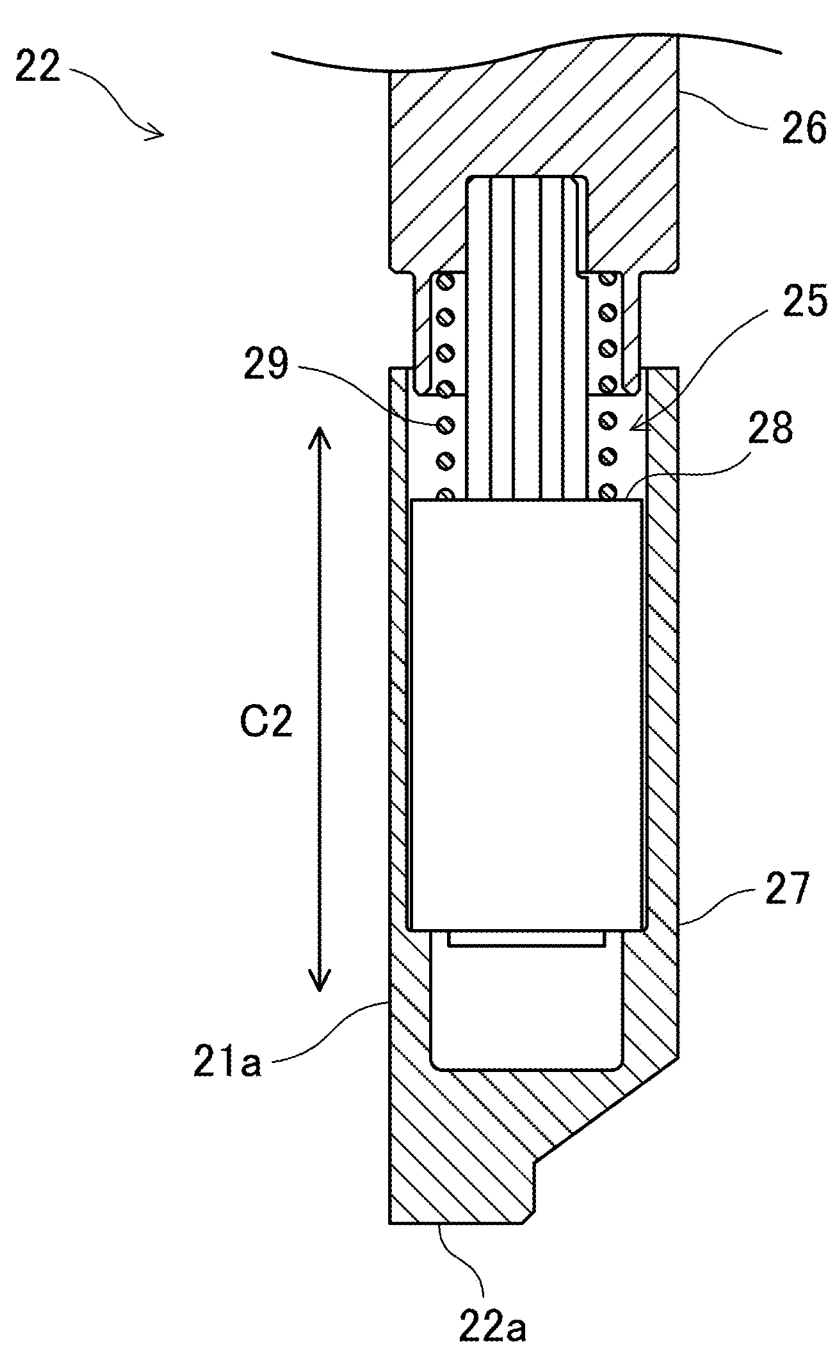
FIG. 4 is an enlarged cross-sectional view about a first part of a first finger.

FIG. 4 is an enlarged cross-sectional view about the first part 22 of the first finger 21. As illustrated in FIG. 4, the damper 25 includes a ball spline 28 and a spring 29. The ball spline 28 couples the fixer 26 and the mover 27 to each other. The ball spline 28 allows the mover 27 to be movable in the extension directions C2 with respect to the fixer 26, and prevents the mover 27 from rotating about the axis of the ball spline 28. The spring 29 is compressed between the fixer 26 and the mover 27. The spring 29 extends and contracts in the extension directions C2. The spring 29 pushes the mover 27 in the extension directions C2 so that the mover 27 extends most from the fixer 26. The first part 22 is normally in this state where the mover 27 extends most from the fixer 26 (hereinafter referred to as a "normal state"). The ball spline 28 includes a roller that guides the mover 27 in the extension directions C2 by rolling. The spring 29 elastically pushes the mover 27.

On the other hand, when shock is exerted from a distal end 22*a* of the mover 27 (hereinafter referred to as the distal end 22*a* of the first finger 21 or the distal end 22*a* of the first part 22) on the mover 27 in the extension directions C2, the mover 27 moves toward the fixer 26 in the extension directions C2, and the spring 29 is compressed to be deformed. Accordingly, the shock is absorbed by the spring 29. Once the shock is removed, the spring 29 extends, and the mover 27 returns to the normal state.

In this manner, the first finger 21 bends by rotation of the first part 22 about the rotation axis B, and absorbs shock on the first finger 21 by extension and contraction of the first part 22.

—Opening/Closing Actuator—

Figure 5:
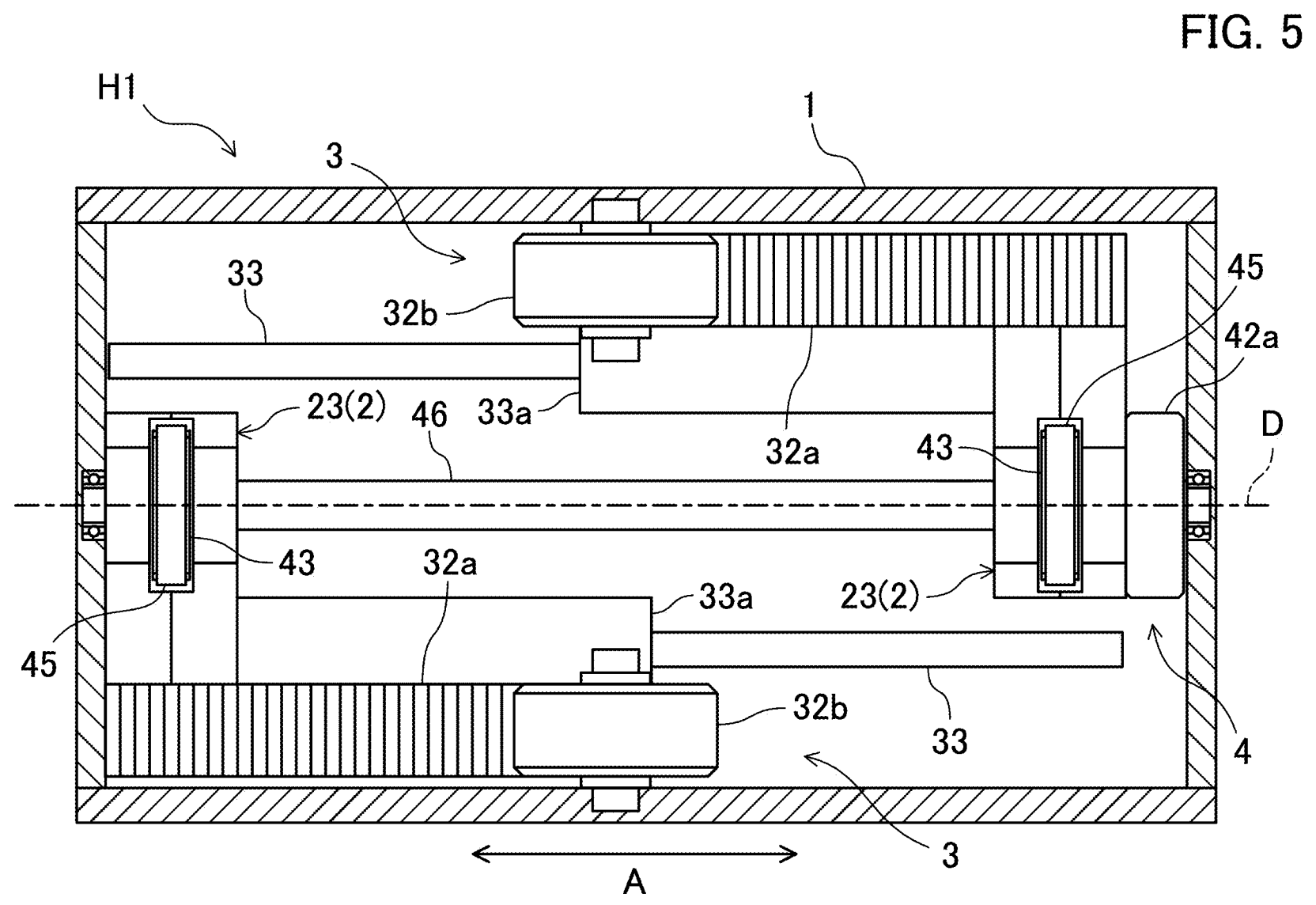
Figure 6:
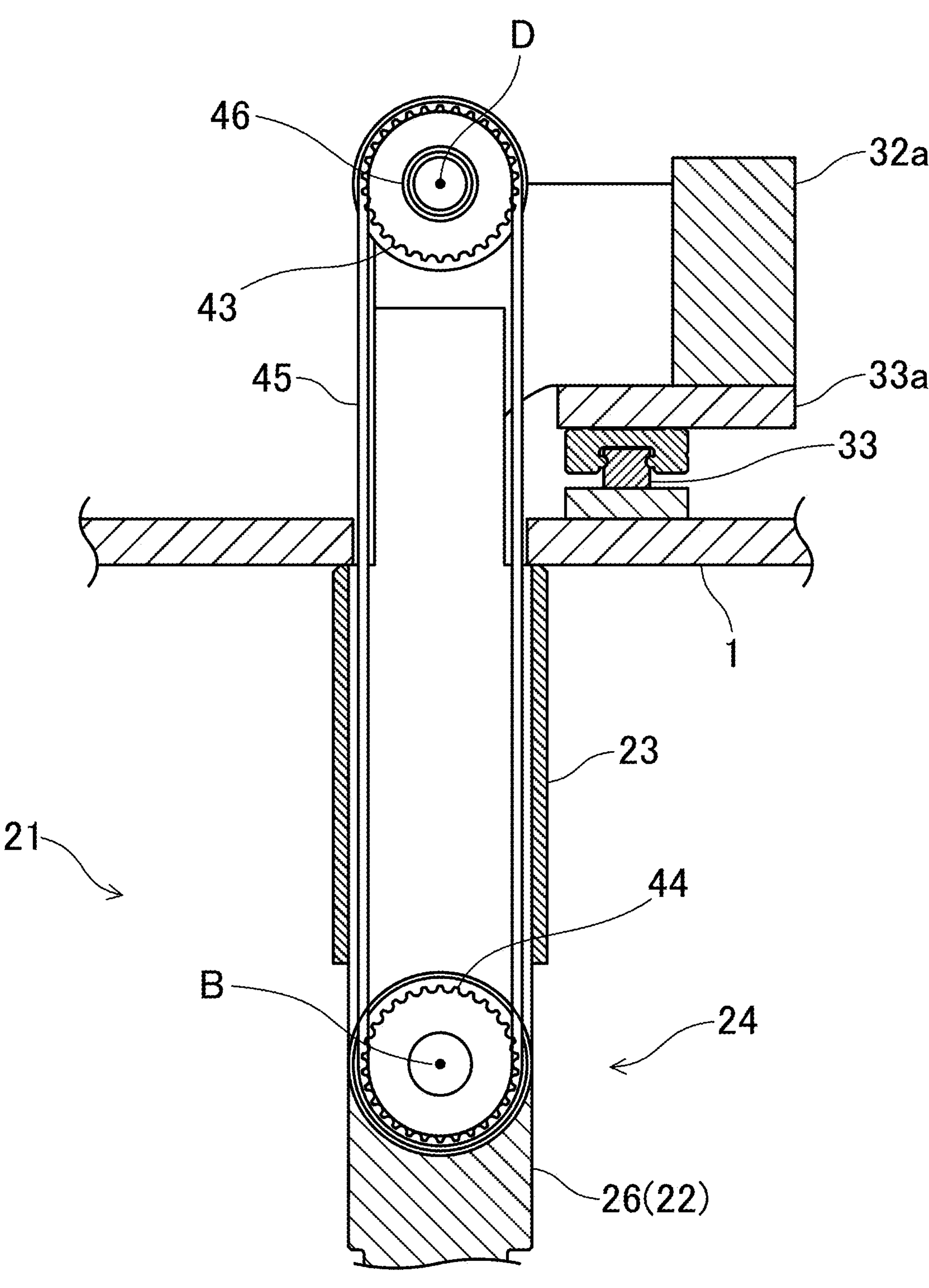
FIG. 6 is an enlarged cross-sectional view about a second part of the first finger.

FIG. 5 is a cross-sectional view of the first hand H1 taken along line V-V in FIG. 3. FIG. 6 is an enlarged cross-sectional view about the second part 23 of the first finger 21. FIG. does not show a part of gear trains 32 of the opening/closing actuators 3 and a part of a gear train 42 of the bending actuator 4.

As illustrated in FIGS. 3 and 5, each of the opening/closing actuators 3 includes a first motor 31, the gear train 32 that transfers a driving force of the first motor 31, and a guide 33 that guides the first fingers 21 in the opening/closing directions A. The two opening/closing actuators 3 are disposed not to interfere with each other in the base 1.

The first motor 31 is, for example, a servo motor and includes an encoder. A driver of the first motor 31 includes a current sensor.

The first fingers 21 is slidably coupled to the guide 33. Specifically, the guide 33 is disposed in the base 1 and extends in the opening/closing directions A. A block 33*a* is slidably disposed on the guide 33. The second part 23 of each of the first fingers 21 is attached to the block 33*a*.

The gear train 32 transfers a driving force of the first motor 31 to the first finger 21. For example, the gear train 32 includes a rack 32*a* and a pinion 32*b* serving as a rack-and-pinion. The rack 32*a* is attached to the block 33*a*. In this state, the rack 32*a* extends in the opening/closing directions A. That is, teeth of the rack 32*a* are arranged in the opening/closing directions A. The pinion 32*b* meshes with the rack 32*a*. Accordingly, a rotary force of the first motor 31 transferred to the pinion 32*b* is converted to a linear moving force of the rack 32*a* in the opening/closing directions A. When the rack 32*a* moves in the opening/closing directions A, the block 33*a* and the first fingers 21 also move in the opening/closing directions A together with the rack 32*a*.

In the thus-configured opening/closing actuator 3, when the first motor 31 is driven, a rotation driving force of the first motor 31 is transferred by the gear train 32. Finally, the rotational driving force is transferred as a linear moving force to the block 33*a* by the rack 32*a* and the pinion 32*b* included in the gear train 32. The block 33*a* moves in the opening/closing directions A along the guide 33. Together with the block 33*a*, the first finger 21 also moves in the opening/closing directions A. The direction of movement of the first finger 21 in the opening/closing directions A is switched by the rotation direction of the first motor 31. The position of the first finger 21 in the opening/closing directions A is detected based on an encoder output of the first motor 31. A rotation torque of the first motor 31 in movement of the first finger 21 is detected based on a detection result of the current sensor.

Since the opening/closing actuator 3 is disposed in each of the first fingers 21, the two first fingers 21 are moved in the opening/closing directions A independently of each other by the opening/closing actuators 3 thereof.

—Bending Actuator—

As illustrated in FIGS. 3, 5, and 6, the bending actuator 4 includes a second motor 41, the gear train 42 that transfers a driving force of the second motor 41, first timing pulleys 43 that receive a driving force of the second motor 41 through the gear train 42, second timing pulleys 44 disposed at the joints 24, and timing belts 45 that transfer rotation of the first timing pulleys 43 to the second timing pulleys 44. Each first finger 21 has one set of the first timing pulley 43, the second timing pulley 44, and the timing belt 45.

The second motor 41 is, for example, a servo motor and includes an encoder. A driver of the second motor 41 includes a current sensor.

The gear train 42 includes a worm gear, a worm wheel, a spur gear 42*a*, and so forth. The spur gear 42*a* is rotatably supported through the ball spline 46. Specifically, the ball spline 46 is disposed in the base 1 and extends in the opening/closing directions A. The ball spline 46 is supported by the base 1 to be rotatable about an axis D of the ball spline 46. The spur gear 42*a* is non-rotatably disposed to the ball spline 46. That is, the spur gear 42*a* rotates integrally with the ball spline 46 about the axis D.

The first timing pulleys 43 are non-rotatably disposed to the ball spline 46. Two first timing pulleys 43 are disposed to the ball spline 46. The first timing pulleys 43 rotate together with the ball spline 46 about the axis D. That is, rotation of the spur gear 42*a* is transferred to the first timing pulleys 43 through the ball spline 46. In addition, the first timing pulleys 43 are slidable with respect to the ball spline 46 in the direction of the axis D.

Each of the first timing pulleys 43 is coupled to an associated one of the first fingers 21. Specifically, the first timing pulley 43 is coupled to an end of the second part 23 near the base 1 and is rotatable about the axis D. That is, when the first finger 21 moves in the opening/closing directions A along the guide 33, the first timing pulley 43 moves in the direction of the axis D of the ball spline 46 together with the first finger 21. While the ball spline 46 rotates, the first finger 21 does not rotate and the first timing pulley 43 rotates together with the ball spline 46.

The second timing pulley 44 is non-rotatably provided to the fixer 26 of the first part 22 in the joint 24 of each first finger 21. That is, when the second timing pulley 44 rotates, the first part 22 rotates about the rotation axis B.

The timing belt 45 is wound around the first timing pulley 43 and the second timing pulley 44. The timing belt 45 transfers rotation of the first timing pulley 43 to the second timing pulley 44.

In the thus-configured bending actuator 4, when the second motor 41 is driven, a rotational driving force of the second motor 41 is transferred to the ball spline 46 through the gear train 42. When the ball spline 46 rotates about the axis D, the first timing pulley 43 disposed to the ball spline 46 rotates about the axis D. Since the first finger 21 is coupled to the guide 33, the first finger 21 does not rotate. Rotation of the first timing pulley 43 is transferred to the second timing pulley 44 by the timing belt 45. When the second timing pulley 44 rotates, the first part 22 of the first finger 21 rotates about the rotation axis B. Accordingly, the first finger 21 bends. At some rotation angle of the first part 22, the first part 22 and the second part 23 are aligned in a straight line.

The rotation direction of the first part 22 about the rotation axis B, that is, the direction of bending of the first finger 21, is switched depending on the rotation direction of the second motor 41. The rotation position of the first part 22 about the rotation axis B, that is, the degree or bending or the bending angle of the first finger 21, is detected based on an encoder output of the second motor 41. A rotation torque of the second motor 41 when the first finger 21 bends is detected based on a detection result of the current sensor.

Each first finger 21 includes a set of the first timing pulley 43, the second timing pulley 44, and the timing belt 45. The first timing pulleys 43 of the first fingers 21 are disposed to the common ball spline 46. That is, driving of the common second motor 41 causes the two first fingers 21 to bend in the same manner at the same time. The direction and angle of bending are the same for the two first fingers 21.

Each first finger 21 can move in the closing directions A along the guide 33. At this time, the first timing pulley 43 also moves in the opening/closing directions A along the ball spline 46 together with the first finger 21. That is, the bending actuator 4 enables the first fingers 21 to bend at any position in the opening/closing directions A.

—Brief Description of Operation of First Hand H1—

The first hand H1 configured as described above moves the two first fingers 21 in the opening/closing directions A by the opening/closing actuators 3 to thereby enable the two first fingers 21 to grip a workpiece. For example, the first hand H1 can grip a workpiece by causing the two first fingers 21 to approach each other (to perform a closing action) in the opening/closing directions A, and also grip a workpiece by causing the two first fingers 21 to move away from each other (to perform an opening action) in the opening/closing directions A.

Since the first hand H1 enables the two first fingers 21 to operate independently of each other by the opening/closing actuators 3, the first hand H1 can grip a workpiece at a position eccentric from the center of the first hand H1 in the opening/closing directions A (hereinafter such gripping will be referred to as eccentric gripping). The center of the first hand H1 herein is, for example, a center Q of a movable range of the first fingers 21 (hereinafter referred to simply as "center Q of the movable range"). More Specifically, the first hand H1 adjusts the amounts of movement of the two first fingers 21 in accordance with the position of the workpiece and grips the workpiece at a position eccentric from the center of the first hand H1. In this manner, even if the workpiece is deviated from the center of the first hand H1, the first hand H1 can grip the workpiece appropriately with the two first fingers 21.

As illustrated in FIG. 2, the first hand H1 can bend the two first fingers 21. Each of the first fingers 21 bends such that the first part 22 moves between a position at which an imaginary region X defined by projecting the first part 22 in the opening/closing directions A (i.e., a region defined by projecting the first part 22 in a direction orthogonal to the drawing sheet in FIG. 2) interferes with an axis E of a second gripper 5 described later and a position at which the imaginary region X does not interfere with the axis E. For example, the first hand H1 can bend the two first fingers 21 gripping the workpiece by the bending actuator 4. Thus, it is also possible to move the workpiece or change the posture of the workpiece by bending the two first fingers 21. Accordingly, the amount of operation of the robot arm 1110 can be reduced.

The first hand H1 can absorb shock on the first parts 22 of the first fingers 21 by the dampers 25. Thus, in moving the first hand H1 to the position of the workpiece, shock on the first parts 22 caused by contact between the distal ends 22*a* of the first parts 22 and the placing table of the workpiece can be absorbed.

=Second Hand=

The second hand H2 is disposed on the base 1 shared by the first hand H1. The second hand H2 grips the workpiece and execute various treatments.

Figure 7:
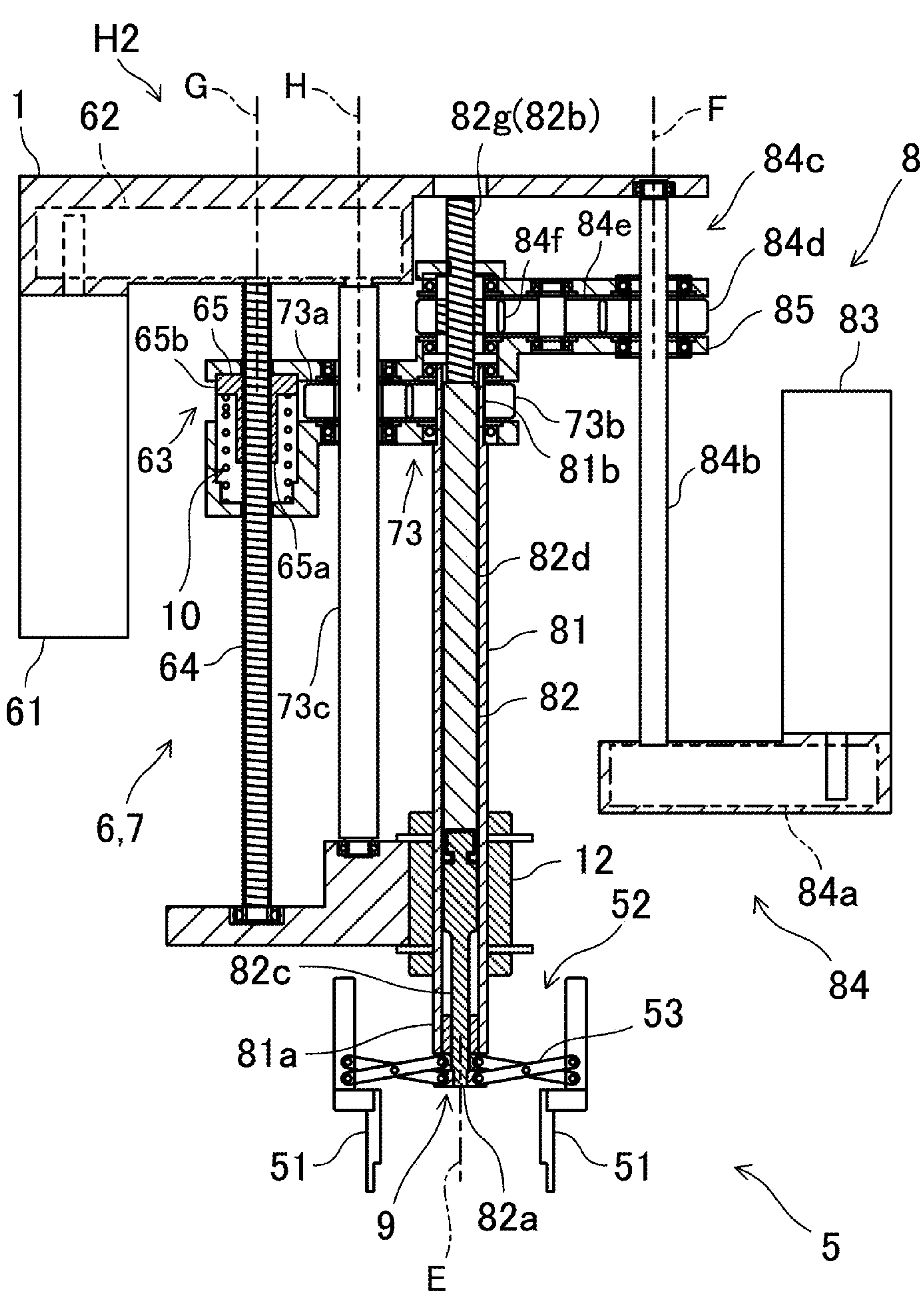
FIG. 7 is a schematic view of a second hand seen from a side opposite to the first hand while showing the inside of the base, where second fingers are fully open.

The second hand H2 will now be described in further detail. FIG. 7 is a schematic view of the second hand H2 seen from a side opposite to the first hand H1 while showing the inside of the base 1, where the second fingers 51 are fully open.

The second hand H2 includes the second gripper 5 that grips a workpiece, a straight-moving actuator 6 that causes the second gripper to move straight in a predetermined direction of the axis E, and a rotation actuator 7 that causes the second gripper 5 to rotate about the axis E. The second gripper 5 includes three second fingers 51 that grip a workpiece, and a linkage 52 that opens and closes the three second fingers 51. The second hand H2 can move a workpiece gripped by the second gripper 5 straight in the direction of the axis E while rotating the workpiece about the axis E. Accordingly, the second hand H2 can insert the workpiece into a hole or screws the workpiece into a screw hole, for example. A side to which the second fingers 51 advance from the base 1 in the direction of the axis E will be hereinafter referred to simply as an "advancing side," and a side to which the second fingers 51 retract to the base 1 will be hereinafter referred to simply as a "retracting side."

The second hand H2 may also include an opening/closing actuator 8 that opens and closes the second fingers 51. The second hand H2 may also include a push actuator 9 that pushes a workpiece released from gripping by the second gripper 5 in the direction of the axis E. The second hand H2 may include a damper 10 that elastically supports the second fingers 51 in the direction of the axis E.

—Gripper—

Figure 8:
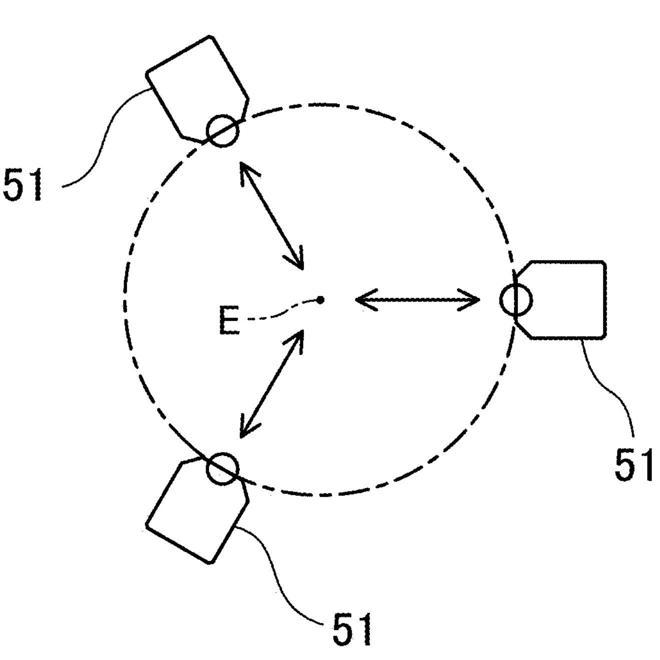
FIG. 8 is a schematic view of the second fingers seen from an advancing side in an axial direction.
Figure 9:
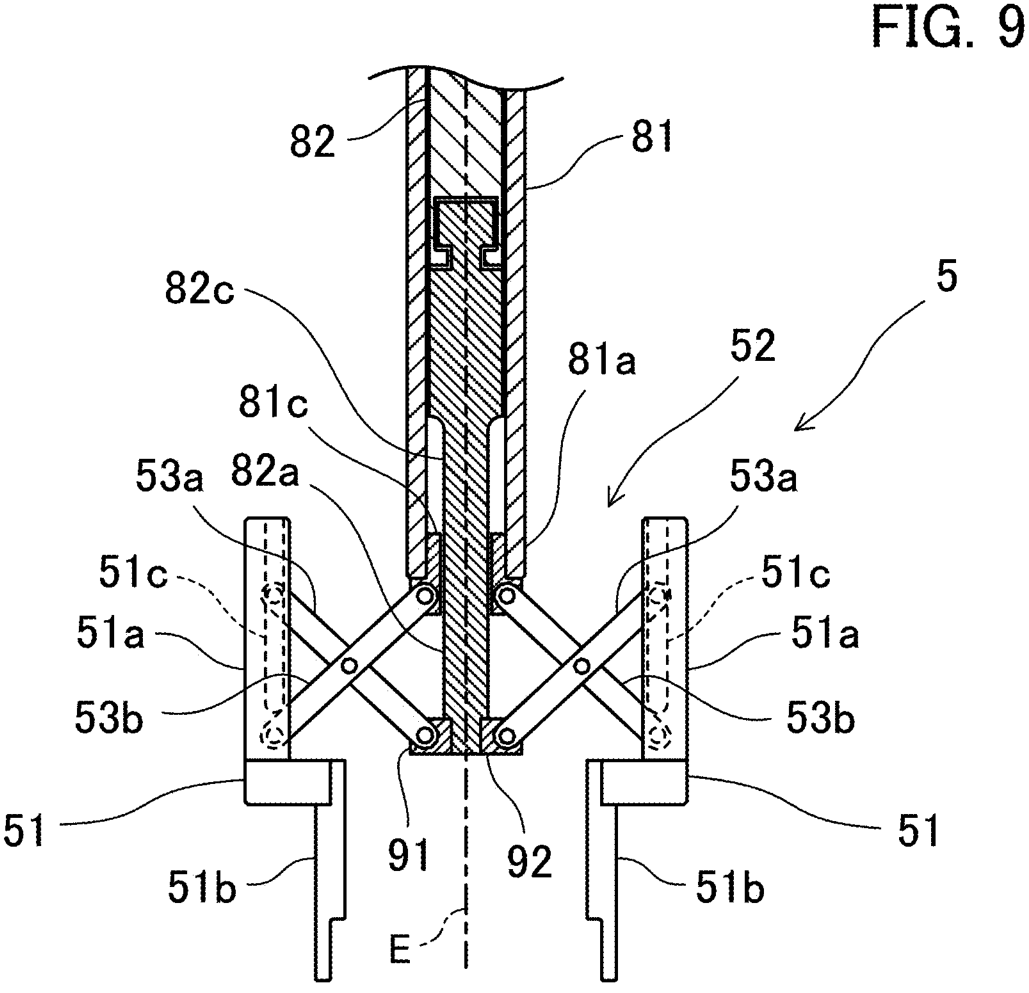
FIG. 9 is a schematic cross-sectional view about a second gripper.

FIG. 8 is a schematic view of the second fingers 51 seen from the advancing side in the direction of the axis E. FIG. 9 is a schematic cross-sectional view about the second gripper 5.

The second gripper 5 includes three second fingers 51, and the linkage 52 that opens and closes the three second fingers 51. The second gripper 5 is an example of a gripper.

As illustrated in FIG. 8, the three second fingers 51 are arranged at regular intervals (i.e., at intervals of 120 degrees) in a circumferential direction about the axis E. The three second fingers 51 are opened and closed about the axis E by the linkage 52. That is, the three second fingers 51 move away from each other and approach each other in a radial direction about the axis E. Accordingly, the three second fingers 51 grip a workpiece and release gripping of the workpiece. The three second fingers 51 are also opened and closed at the same distance from the axis E. The three second fingers 51 are an example of at least two fingers. Although the three second fingers 51 are arranged at intervals of 120 degrees about the axis E, FIG. 7 shows a state where two second fingers 51 are disposed at intervals of 180 degrees about the axis E for easy illustration of the configuration.

As illustrated in FIG. 9, each of the second fingers 51 generally extends in the direction of the axis E. Each second finger 51 includes a base 51*a* and a nail 51*b*. The nail 51*b* is disposed at the distal end of the base 51*a*. The nail 51*b* defines a distal end portion of the second finger 51. The second fingers 51 grip a workpiece with the nails 51*b*.

The linkage 52 includes links 53. The links 53 include three sets of first links 53*a* and second links 53*b*. In the drawings, the links are distinguished from each other and denoted by "53*a*" and "53*b*" in some cases or are not distinguished from each other and collectively denoted by "53" in other cases. One set of the first link 53*a* and the second link 53*b* are coupled to each of the second fingers 51. The first links 53*a* and the second links 53*b* intersect with each other, and are rotatably coupled to each other at longitudinal centers thereof. The links 53 are disposed inside the three second fingers 51 in the radial direction about the axis E.

The first links 53*a* are rotatably coupled to the second fingers 51 at one end. Specifically, the base 51*a* of each second finger 51 includes an elongated hole 51*c* extending in the extension direction of the second finger 51. One end of each first link 53*a* is rotatably and slidably coupled to the elongated hole 51*c*.

One end of each second link 53*b* is rotatably coupled to the second finger 51. Specifically, one end of the second link 53*b* is rotatably coupled to a portion of the base 51*a* of the second finger 51 closer to the distal end of the second finger 51 than the elongated hole 51*c*.

—Opening/Closing Actuator—

As illustrated in FIG. 7, the opening/closing actuator 8 opens and closes the three second fingers 51 by operating the linkage 52. The opening/closing actuator 8 includes an outer cylinder 81, a shaft 82, a third motor 83 that drives the linkage 52, and a gear train 84 that transfers a driving force of the third motor 83 to the shaft 82.

The outer cylinder 81 and the shaft 82 extend in the direction of the axis E coaxially about the axis E. Specifically, the outer cylinder 81 has a substantially cylindrical shape about the axis E. The shaft 82 has a substantially columnar shape about the axis E.

In the outer cylinder 81 and the shaft 82, ends on one side in the direction of the axis E will be referred to as a first end 81*a* and a first end 82*a*, respectively, and ends on the other side in the direction of the axis E will be referred to as a second end 81*b* and a second end 82*b*. The first end 81*a* and the first end 82*a* are ends on the advancing side in the direction of the axis E. The second end 81*b* and the second end 82*b* are ends on the retracting side in the direction of the axis E. The second gripper 5 is coupled to the first end 81*a* and the first end 82*a*.

The outer cylinder 81 is supported by a bearing 12 attached to the base 1 and is movable in the direction of the axis E and rotatable about the axis E.

The shaft 82 is inserted in the outer cylinder 81. The outer cylinder 81 and the shaft 82 are rotatable relative to each other about the axis E and movable relative to each other in the direction of the axis E. The first end 82*a* of the shaft 82 projects outward from the first end 81*a* of the outer cylinder 81. The second end 82*b* of the shaft 82 projects outward from the second end 81*b* of the outer cylinder 81.

The shaft 82 is divided into a link shaft 82*c* including the first end 82*a* and a shaft body 82*d* including the second end 82*b*. The link shaft 82*c* and the shaft body 82*d* are coupled to each other to be rotatable about the axis E and immovable in the direction of the axis E. The second end 82*b* has an external thread 82*g*.

As illustrated in FIG. 9, a pushing block 91 is disposed at the distal end of the link shaft 82*c*, that is, the distal end of the first end 82*a*.

A substantially cylindrical link block 81*c* that guides the link shaft 82*c* is disposed at the first end 81*a* of the outer cylinder 81. The link shaft 82*c* penetrates the link block 81*c*. A small clearance is present between the link shaft 82*c* and the link block 81*c*.

The linkage 52 is coupled to the first end 81*a* of the outer cylinder 81 and the first end 82*a* of the shaft 82. Specifically, ends of the first links 53*a* on one side (ends not coupled to the second fingers 51) are rotatably coupled to the first end 82*a* of the shaft 82, specifically, the pushing block 91. Ends of the second links 53*b* on one side (ends not coupled to the second fingers 51) are rotatably coupled to the first end 81*a* of the outer cylinder 81, specifically, the link block 81*c*.

When the link shaft 82*c* moves in the direction of the axis E, relative positions of ends of the first links 53*a* one side and ends of the second links 53*b* on one side change, and accordingly, the positions of the second fingers 51 in the direction of the axis E and the positions of the second fingers 51 in the radial direction about the axis E change.

The third motor 83 is, for example, a servo motor and includes an encoder. A driver of the third motor 83 includes a current sensor. As illustrated in FIG. 7, the third motor 83 is supported by the base 1.

The gear train 84 includes a first gear train 84*a* and a second gear train 84*c* disposed in this order from the third motor 83.

The first gear train 84*a* includes gears. The gears of the first gear train 84*a* are supported by the base 1 to be rotatable about an axis parallel to the axis E. The first gear train 84*a* transfers a rotational driving force of the third motor 83 to the second gear train 84*c* through the ball spline 84*b*. The ball spline 84*b* includes an axis F parallel to the axis E of the shaft 82. The ball spline 84*b* is supported by the base 1 to be rotatable about the axis F. A gear (gear at the final stage) in the first gear train 84*a* is coupled to the ball spline 84*b* to be nonrotatable about the axis F and immovable along the axis F. That is, when the gears of the first gear train 84*a* rotate, the ball spline 84*b* rotates about the axis F.

The second gear train 84*c* is housed in a gear box 85. The second gear train 84*c* includes a first gear 84*d*, a second gear 84*e*, and a third gear 84*f*. The first gear 84*d*, the second gear 84*e*, and the third gear 84*f* are supported by the gear box 85 to be rotatable about an axis parallel to the axis E.

The first gear 84*d* is coupled to the first gear train 84*a* through the ball spline 84*b*. The first gear 84*d* is coupled to the ball spline 84*b* to be non-rotatable about the axis F and movable along the axis F. That is, the first gear 84*d* rotates integrally with the ball spline 84*b*.

The internal periphery of the third gear 84*f* has an internal thread. The third gear 84*f* is screwed with the external thread 82*g* of the shaft 82. The second gear 84*e* is located between the first gear 84*d* and the third gear 84*f* and meshes with each of the first gear 84*d* and the third gear 84*f*.

The gear box 85 supports the outer cylinder 81 such that the outer cylinder 81 is rotatable about the axis E and immovable in the direction of the axis E. The shaft 82 is supported by the gear box 85 through the third gear 84*f*. The gear box 85 restricts rotation of the shaft 82 about the axis E to prevent the shaft 82 from rotating about the axis E.

Figure 11:
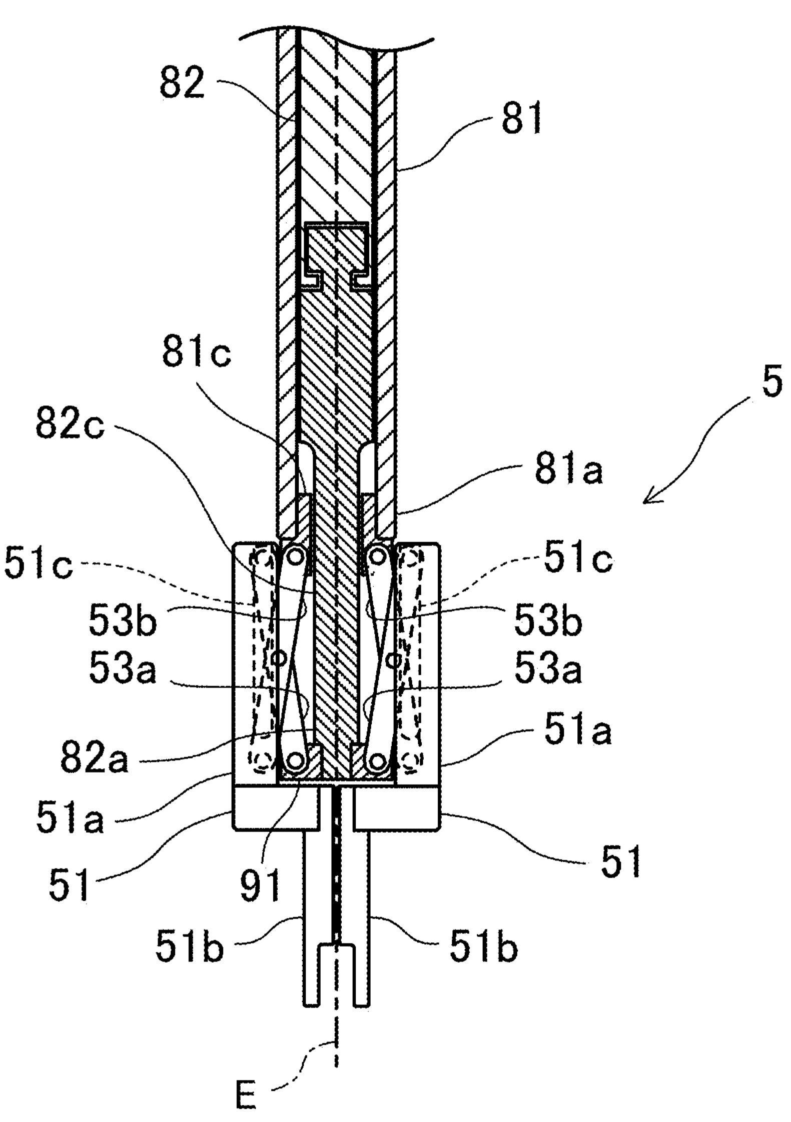
FIG. 11 is a schematic cross-sectional view about the second gripper where the second fingers are fully closed.

Operation of the thus-configured opening/closing actuator 8 will be described. FIG. is a schematic view of the second hand H2 seen from a side opposite to the first hand H1 while showing the inside of the base 1, where the second fingers 51 are fully closed. FIG. 11 is a schematic cross-sectional view about the second gripper 5 where the second fingers 51 are fully closed.

When the third motor 83 is driven, a rotational driving force of the third motor 83 is transferred to the ball spline 84*b* through the first gear train 84*a*. When the ball spline 84*b* rotates about the axis F, the first gear 84*d* coupled to the ball spline 84*b* rotates about the axis F. Rotation of the first gear 84*d* is transferred to the third gear 84*f* through the second gear 84*e*. Since the shaft 82 does not rotate about the axis E, when the third gear 84*f* rotates, the shaft 82 moves in the direction of the axis E relative to the third gear 84*f*, as illustrated in FIG. That is, the shaft 82 moves in the direction of the axis E relative to the outer cylinder 81. The movement of the shaft 82 in the direction of the axis E causes ends of the first links 53*a* on one side to move in the direction of the axis E together with the shaft 82, as illustrated in FIG. 11. Relative positions of the ends of the second links 53*b* on one side coupled to the outer cylinder 81 and the ends of the first links 53*a* on one side coupled to the shaft 82 in the direction of the axis E change so that relative positions of the first links 53*a* and the second links 53*b* thereby change. Accordingly, the three second fingers 51 move in the radial direction about the axis E. That is, the three second fingers 51 are opened and closed.

The direction of movement of the shaft 82 in the direction of the axis E, that is, whether the three second fingers 51 move away from or toward one another about axis E, is switched depending on the rotation direction of the third motor 83. The positions of the three second fingers 51 in the radial direction about the axis E, that is, the degree of opening and closing the three second fingers 51, is detected based on an encoder output of the third motor 83. In addition, a rotation torque of the third motor 83 in opening and closing the three second fingers 51 is detected based on a detection result of the current sensor.

—Straight-Moving Actuator and Rotation Actuator—

As described above, the second gripper 5 is coupled to the outer cylinder 81 and the shaft 82. The straight-moving actuator 6 causes the second gripper 5 to move in the direction of the axis E by moving the outer cylinder 81 and the shaft 82 in the direction of the axis E. The rotation actuator 7 causes the second gripper 5 to rotate about the axis E by rotating the outer cylinder 81 and the link shaft 82*c* of the shaft 82 about the axis E. In this example, some elements are shared by the straight-moving actuator 6 and the rotation actuator 7. Some elements of the straight-moving actuator 6 are shared by the opening/closing actuator 8. Some elements of the rotation actuator 7 are shared by the opening/closing actuator 8.

Figure 10:
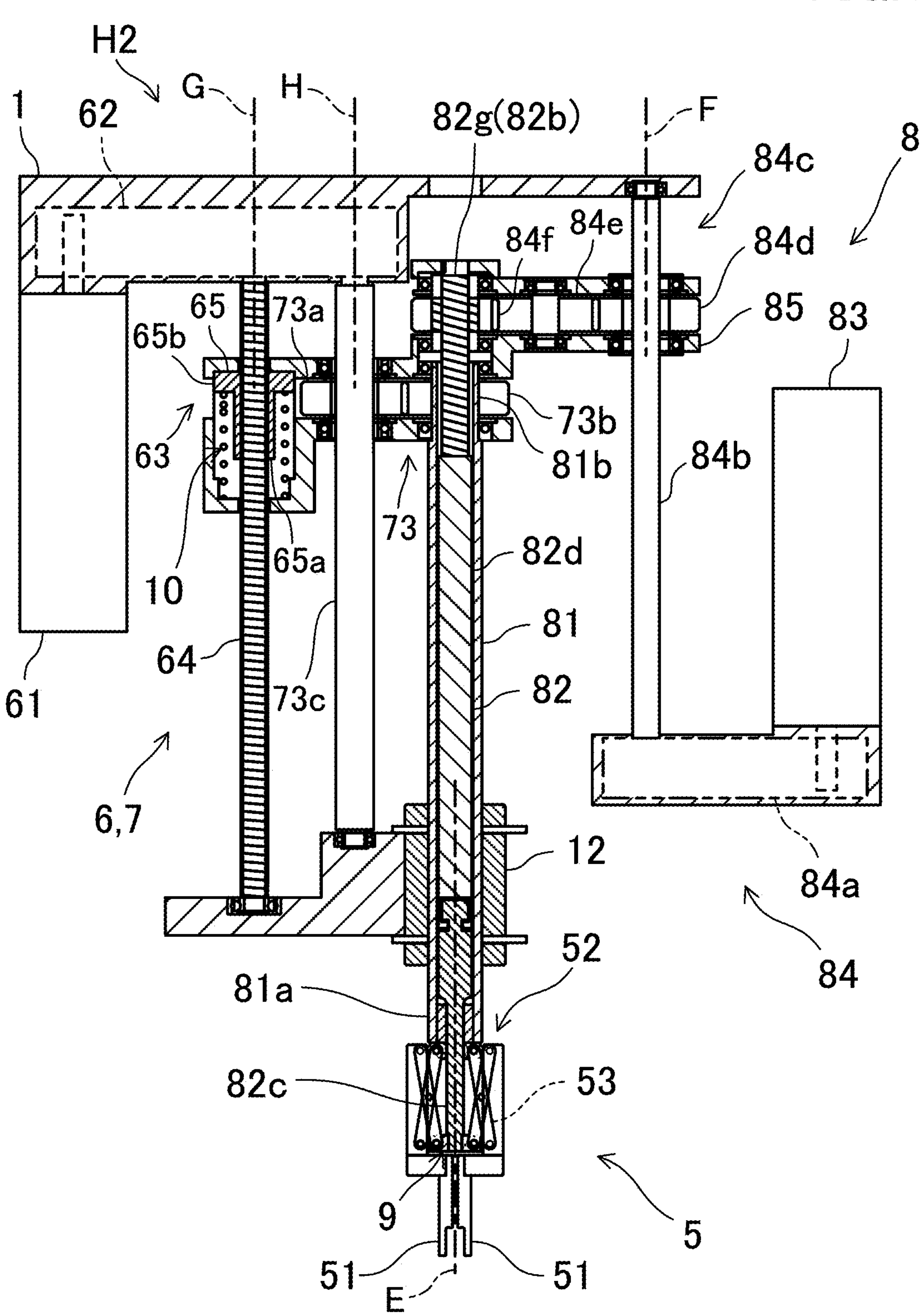
FIG. 10 is a schematic view of the second hand seen from the side opposite to the first hand while showing the inside of the base, where the second fingers are fully closed.

Specifically, as illustrated in FIGS. 7 and 10, the straight-moving actuator 6 includes a fourth motor 61, a first gear train 62 that transfers a driving force of the fourth motor 61, a feed screwer 63, the outer cylinder 81, and the shaft 82.

The fourth motor 61 is, for example, a servo motor and includes an encoder. A driver of the fourth motor 61 includes a current sensor. The fourth motor 61 is supported by the base 1. The fourth motor 61 is an example of a driver.

The first gear train 62 includes gears rotatably supported by the base 1.

The feed screwer 63 includes a feed screw 64 and a nut 65 as a straight-moving element that meshes with the feed screw 64.

An axis G of the feed screw 64 extends in parallel with the axis E. The feed screw 64 is non-rotatably coupled to a gear included in the first gear train 62. That is, the feed screw 64 rotates about the axis G integrally with this gear.

The nut 65 meshes with the feed screw 64. The nut 65 is housed in the gear box 85. Rotation of the nut 65 is stopped by the gear box 85 not to rotate about the axis G. The nut 65 includes a cylindrical body 65*a* and a flange 65*b* disposed on the body 65*a*.

The nut 65 is elastically pushed against the gear box 85 by the damper 10 in the direction of the axis G, that is, in the direction of the axis E. Specifically, the damper 10 is a spring. More specifically, the damper 10 is a coil spring. The damper 10 is located at the advancing side of the flange 65*b* in the direction of the axis E. The damper 10 is compressed between the flange 65*b* and the gear box 85. The damper 10 pushes the gear box 85 by an elastic force against the nut 65 to the advancing side in the direction of the axis E. Accordingly, when the nut 65 moves in the direction of the axis G, the gear box 85 also moves in the direction of the axis G, that is, in the direction of the axis E, together with the nut 65.

The configurations of the outer cylinder 81 and the shaft 82 have been described above. The outer cylinder 81 is supported by the gear box 85 to be rotatable about the axis E and immovable in the direction of the axis E. The shaft 82 is supported by the gear box 85 through the third gear 84*f*. Accordingly, when the gear box 85 moves in the direction of the axis E, the outer cylinder 81 and the shaft 82 also move in the direction of the axis E together with the gear box 85.

As illustrated in FIGS. 7 and 10, the rotation actuator 7 includes the fourth motor 61, the first gear train 62 that transfers a driving force of the fourth motor 61, a second gear train 73 that further transfers a driving force of the fourth motor 61 from the first gear train 62 to the outer cylinder 81, the outer cylinder 81, and the shaft 82. That is, the fourth motor 61, the first gear train 62, the outer cylinder 81, and the shaft 82 of the rotation actuator 7 are shared by the straight-moving actuator 6.

The second gear train 73 includes a fifth gear 73*a* and a sixth gear 73*b*. The fifth gear 73*a* and the sixth gear 73*b* are supported by the gear box 85 to be immovable in the direction of the axis E and rotatable about an axis parallel to the axis E.

The fifth gear 73*a* is coupled to a gear included in the first gear train 62 through the ball spline 73*c*. An axis H of the ball spline 73*c* extends in parallel with the axis E. The ball spline 73*c* is coupled to this gear to be non-rotatable about the axis H. That is, the ball spline 73*c* rotates about the axis H integrally with this gear.

The fifth gear 73*a* is coupled to the ball spline 73*c* to be non-rotatable about the axis H and movable in the direction of the axis H. That is, the fifth gear 73*a* rotates integrally with the ball spline 73*c*. At this time, the fifth gear 73*a* rotates relative to the gear box 85.

The sixth gear 73*b* is coupled to the outer cylinder 81 to be non-rotatable about the axis E and immovable in the direction of the axis E. That is, the sixth gear 73*b* rotates integrally with the outer cylinder 81.

Figure 12:
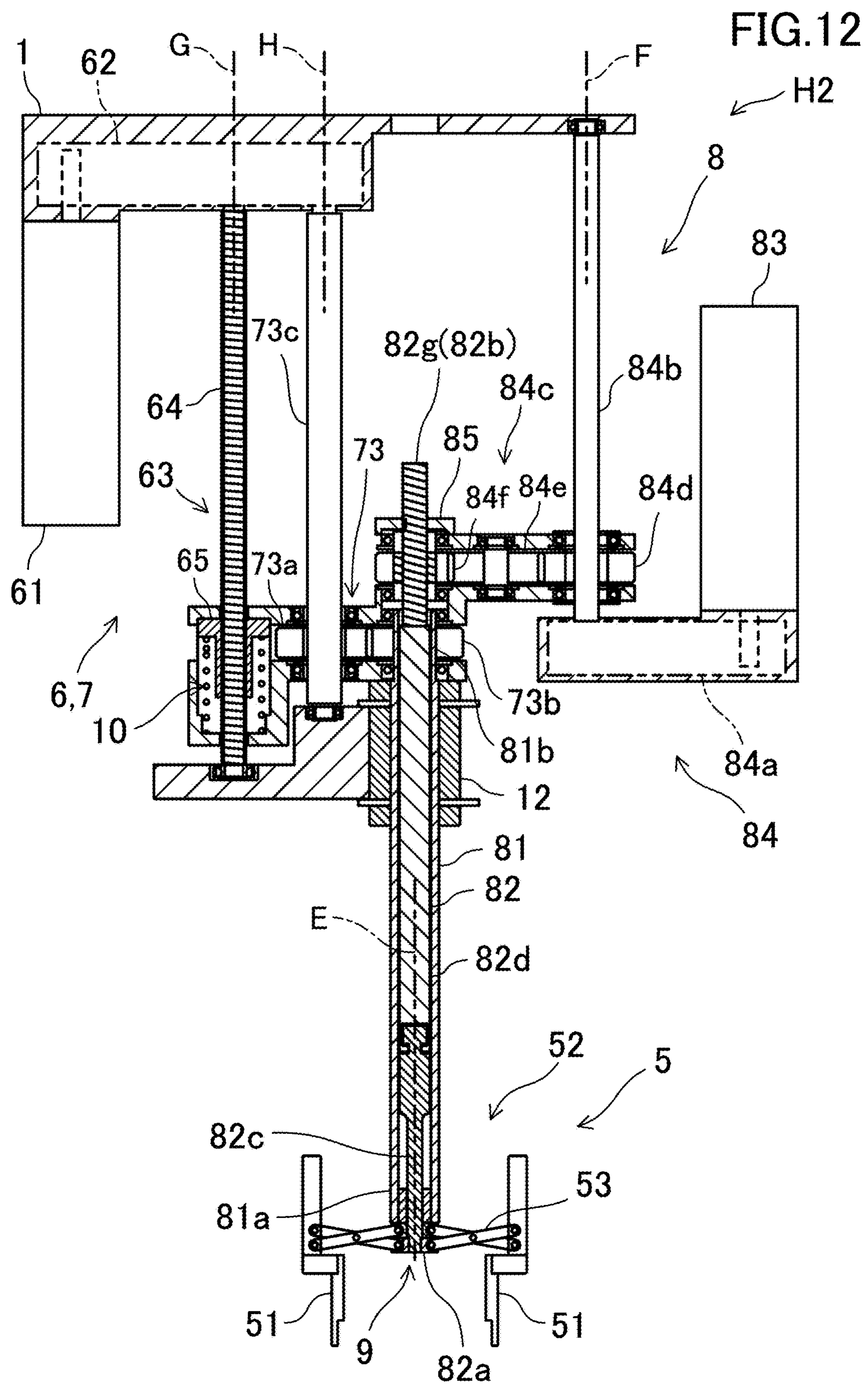
FIG. 12 is a schematic view of the second hand seen from the side opposite to the first hand while showing the inside of the base, where the second fingers are fully closed and advance in the axial direction.

Operation of the thus-configured straight-moving actuator 6 and rotation actuator 7 will be described. FIG. 12 is a schematic view of the second hand H2 seen from a side opposite to the first hand H1 while showing the inside of the base 1, where the second fingers 51 are fully open and have advanced in the direction of the axis E.

When the fourth motor 61 is driven, a rotational driving force of the fourth motor 61 is transferred to the ball spline 73*c* through the first gear train 62. When the ball spline 73*c* rotates about the axis H, rotation of the ball spline 73*c* is transferred to the second gear train 73. Accordingly, the sixth gear 73*b* rotates about the axis E, and the outer cylinder 81 also rotates about the axis E together with the sixth gear 73*b*. The second links 53*b* of the links 53 are coupled to the first end 81*a* of the outer cylinder 81. The link shaft 82*c* to which the first links 53*a* of the links 53 are coupled freely rotates about the axis E with respect to the shaft body 82*d*. Thus, when the second links 53*b* rotate about the axis E, the first links 53*a* also rotate about the axis E together with the second links 53*b*. Consequently, the three second fingers 51 rotate about the axis E.

Even when the three second fingers 51 rotate about the axis E, the shaft body 82*d* does not rotate unless the third motor 83 operates. Thus, relative positions of the outer cylinder 81 and the shaft 82 in the direction of the axis E do not change. Consequently, the three second fingers 51 rotate about the axis E without a change of the opening/closing state of the three second fingers 51.

At the same time, a rotational driving force of the fourth motor 61 is transferred to the feed screw 64 through the first gear train 62. When the feed screw 64 rotates about the axis G, the nut 65 screwed with the feed screw 64 moves in the direction of the axis G. When the nut 65 moves along the axis G, the gear box 85 also moves in the direction of the axis G, that is, in the direction of the axis E. The gear box 85 supports the outer cylinder 81 and the shaft 82. Thus, when the gear box 85 moves in the direction of the axis E, the outer cylinder 81 and the shaft 82 also move in the direction of the axis E together with the gear box 85. At this time, the outer cylinder 81 is caused to rotate about the axis E by the rotation actuator 7. That is, the outer cylinder 81 moves straight in the direction of the axis E while rotating about the axis E.

The gear box 85 also supports the second gear train 84*c* of the opening/closing actuator 8. Thus, while the gear box 85 moves in the direction of the axis E, the second gear train 84*c* also moves in the direction of the axis E integrally with the gear box 85. The first gear 84*d* included in the second gear train 84*c* is also coupled to the ball spline 84*b* as well as being supported by the gear box 85. Thus, while the gear box 85 moves in the direction of the axis E, the first gear 84*d* slides along the ball spline 84*b* and moves in the direction of the axis E together with the gear box 85. At this time, as long as the third motor 83 does not operate, the first gear 84*d* moves in the direction of the axis E without rotating about the axis F of the ball spline 84*b*. Thus, gears included in the second gear train 84*c* do not rotate. Accordingly, while the gear box 85 moves in the direction of the axis E, relative positions of the outer cylinder 81 and the shaft 82 do not change. Consequently, the three second fingers 51 move in the direction of the axis E without a change of the opening/closing state of the three second fingers 51.

The fifth gear 73*a* is also coupled to the ball spline 73*c* as well as being supported by the gear box 85. It should be noted that the fifth gear 73*a* is movable along the ball spline 73*c* in the direction of the axis H. Thus, while the gear box 85 moves in the direction of the axis E, the fifth gear 73*a* slides along the ball spline 73*c* and moves in the direction of the axis E together with the gear box 85. Even when the gear box 85 moves in the direction of the axis E, the fifth gear 73*a* transfers rotation of the ball spline 73*c* to the sixth gear 73*b* appropriately.

—Push Actuator—

The push actuator 9 pushes a workpiece released from gripping by the second gripper in the direction of the axis E. In this example, the push actuator 9 is formed integrally with the straight-moving actuator 6. That is, some elements of the push actuator 9 are shared by the straight-moving actuator 6. Specifically, as illustrated in FIGS. 7, 10, and 12, the push actuator 9 includes the fourth motor 61, the first gear train 62 that transfers a driving force of the fourth motor 61, the feed screwer 63, the shaft 82, and the pushing block 91 disposed on the shaft 82 (see FIGS. 9 and 11).

As described above, a driving force of the fourth motor 61 is transferred to the feed screwer 63 by the first gear train 62. The feed screwer 63 causes the shaft 82 to move straight in the direction of the axis E through the gear box 85 and other members. As illustrated in FIG. 9, the pushing block 91 is disposed at the distal end of the link shaft 82*c* of the shaft 82, that is, the distal end of the first end 82*a*. The pushing block 91 has a pushing surface 92 orthogonal to the axis E. When the shaft 82 moves straight in the direction of the axis E by driving the fourth motor 61, the pushing block 91 moves straight in the direction of the axis E. The pushing block 91 is an example of a pusher.

The links 53 of the linkage 52 are coupled to the pushing block 91. In a case where the second fingers 51 are open (at least a case where the second fingers 51 are open at maximum), the second fingers 51 are retracted outward in the radial direction about the axis E from space on the advancing side of the pushing block 91 in the direction of the axis E. In such a state where the second fingers 51 are in the open state, it is possible to avoid interference of the workpiece and the second fingers 51 when the pushing block 91 moves straight in the direction of the axis E. That is, the pushing block 91 can push the workpiece without interference with the second fingers 51.

—Damper—

Figure 13:
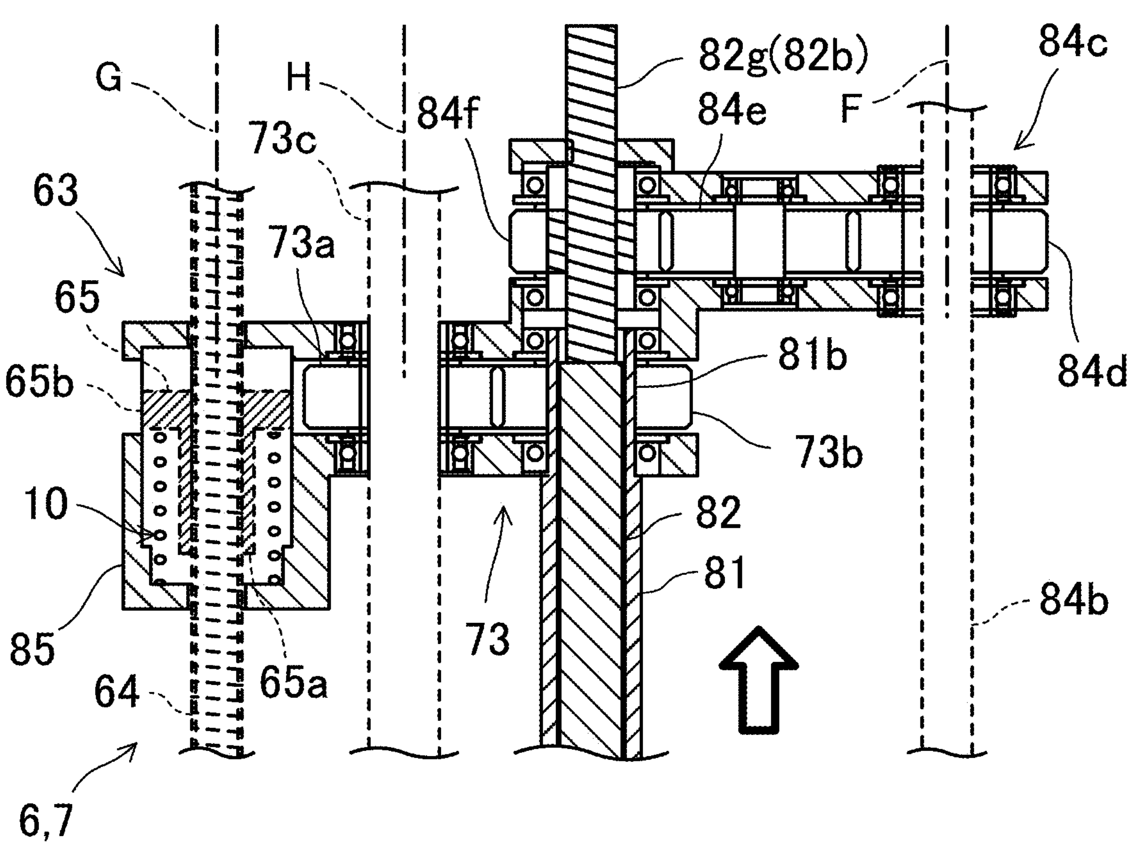
FIG. 13 is an enlarged cross-sectional view about a damper.

FIG. 13 is an enlarged cross-sectional view about the damper 10. In FIG. 13, members not movable relative to the base 1 in the damping function of the damper 10, that is, the feed screw 64, the nut 65, the ball spline 73*c*, and the ball spline 84*b*, are shown by broken lines. The damper 10 elastically couples the nut 65 of the feed screwer 63 to the gear box 85. Specifically, the damper 10 is housed in the gear box 85. The nut 65 and the gear box 85 are elastically coupled to each other such that the gear box 85 is displaceable relative to the nut 65 to the retracting side in the direction of the axis E. The gear box 85 supports the outer cylinder 81 and the shaft 82. The second fingers 51 are coupled to the first end 81*a* of the outer cylinder 81 and the first end 82*a* of the shaft 82 through the links 53. That is, the damper 10 elastically supports the second fingers 51 such that the second fingers 51 are displaceable to the retracting side in the direction of the axis E.

When a force is exerted on the second fingers 51 to the retracting side in the direction of the axis E, the damper 10 is elastically deformed, that is, deformed by compression, so that the second fingers 51, the linkage 52, the outer cylinder 81, the shaft 82, and the gear box 85 move as one unit to the retracting side in the direction of the axis E. In this manner, the force exerted on the second fingers 51 is absorbed.

—Brief Description of Operation of Second Hand H2—

The thus-configured second hand H2 enables the second fingers 51 to move in the direction of the axis E by the straight-moving actuator 6 to a position appropriate for gripping a workpiece in gripping the workpiece with the second fingers 51. For example, the second hand H2 moves the three second fingers 51 in the open state to the vicinity of the workpiece in the direction of the axis E by the straight-moving actuator 6, and then, closes the three second fingers 51 to thereby grip the workpiece with the second fingers 51. The second hand H2 can also grip the workpiece by opening the second fingers 51.

The second hand H2 moves the second fingers 51 straight in the direction of the axis E while rotating the second fingers 51 about the axis E with the workpiece gripped by the second fingers 51. In this manner, the second hand H2 enables work of coupling one of workpieces to be coupled together by insertion to the other workpiece (hereinafter referred to as “coupling work”). The coupling work includes fitting work of coupling two workpieces by fitting and screwing work of coupling two workpieces by screwing. The fitting work includes work of fitting one workpiece into the inside of the other workpiece and work of fitting one workpiece onto the outside of the other workpiece. The screwing work includes work of screwing one workpiece having an external thread into the other workpiece having an internal thread and work of screwing one workpiece having an internal thread to the other workpiece having an external thread. In the fitting work, the second hand H2 can fit one workpiece to the other workpiece by pushing one workpiece by the pushing block 91 in the direction of the axis E, as well as fitting one workpiece to the other workpiece while rotating one workpiece about the axis with the one workpiece gripped by the second fingers 51.

In addition, in the second hand H2, when a force is exerted on the second fingers 51 to the retracting side in the direction of the axis E in gripping a workpiece with the second fingers 51 or in performing coupling work of a workpiece, the second fingers 51 retract in the direction of the axis E and the damper 10 absorbs the force.

The controller 1200 is a robot controller including a computer such as a microcontroller. The controller 1200 executes software such as a basic program as a robot controller stored to thereby control actions of the robot arm 1110 and the hand 100. Specifically, the controller 1200 moves the robot arm 1110 by controlling an actuator (not shown) incorporated in the robot arm 1110. The controller 1200 controls the first motor 31 and the second motor 41 to thereby move the first hand H1. The controller 1200 controls the third motor 83 and the fourth motor 61 to thereby move the second hand H2. The controller 1200 may be individually disposed to each of the hand 100 and the robot arm 1110.

—Assembly Work—

Figure 14:
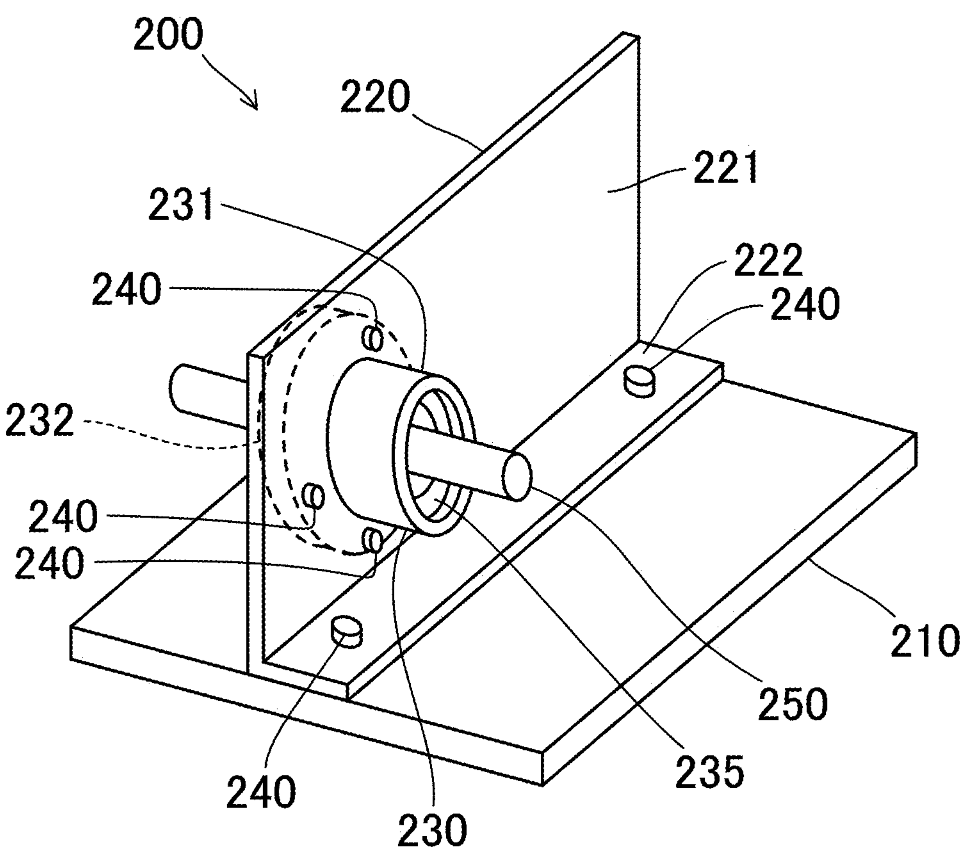
FIG. 14 is a perspective view illustrating a schematic configuration of a bearing unit.

Assembly work of a bearing unit 200 by the thus-configured hand 100 will be described as an example. FIG. 14 is a perspective view illustrating a schematic configuration of the bearing unit 200. In the bearing unit 200, a bearing 235 and a bearing holder 230 are attached to an angle 220 fixed to a base plate 210, and a shaft 250 is inserted in a bearing 235. The assembly work of the bearing unit 200 includes work of placing the angle 220 on the base plate 210 (placing work), work of fastening the angle 220 to the base plate 210 with bolts 240 (first fastening work), work of inserting the bearing holder 230 into an attachment hole 224 of the angle 220 (holder inserting work), work of positioning the bearing holder 230 (positioning work), work of fastening the bearing holder 230 to the angle 220 with bolts 240 (second fastening work), and work of inserting the shaft 250 into the bearing 235 attached to the bearing holder 230 (shaft inserting work).

—Description of Components—

Figure 15:
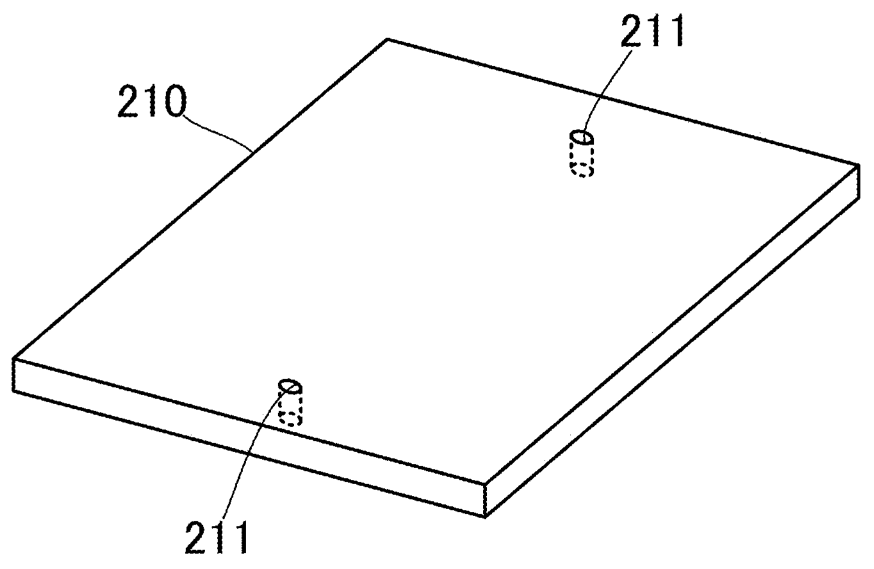
FIG. 15 is a perspective view illustrating a schematic configuration of a base plate.
Figure 16:
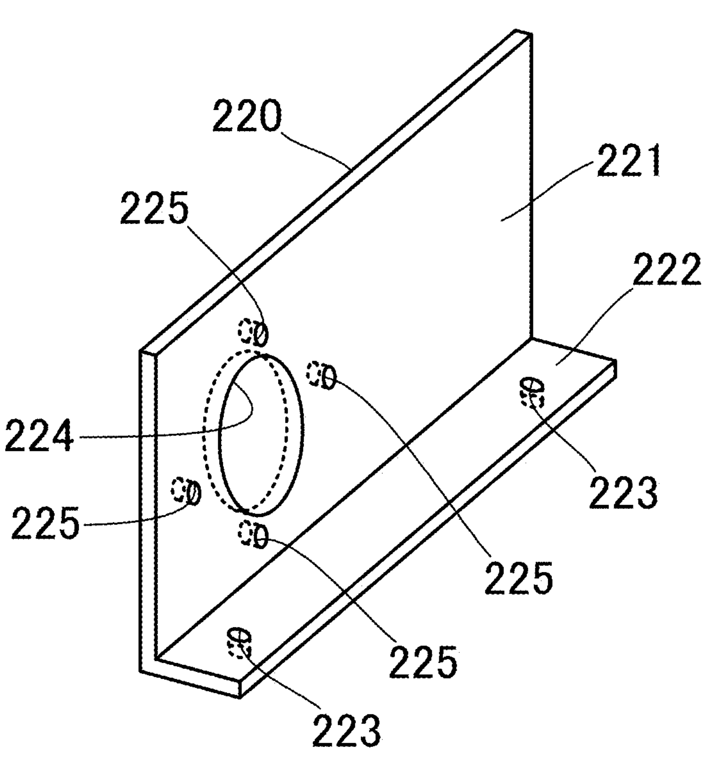
FIG. 16 is a perspective view illustrating a schematic configuration of an angle.
Figure 17:
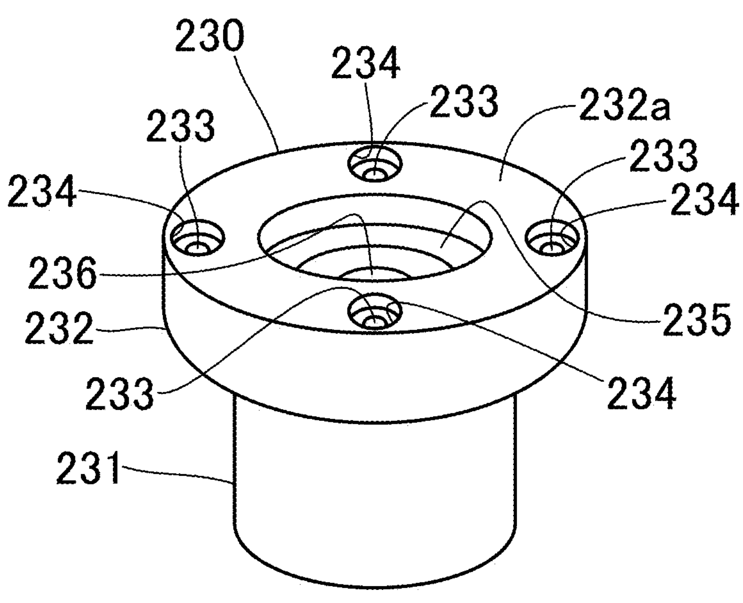
FIG. 17 is a perspective view illustrating a schematic configuration of a bearing holder.

The assembly work of the bearing unit 200 includes the base plate 210, the angle 220, the bearing holder 230, the bolts 240, and the shaft 250 as components. FIG. 15 is a perspective view illustrating a schematic configuration of the base plate 210. FIG. 16 is a perspective view illustrating a schematic configuration of the angle 220. FIG. 17 is a perspective view illustrating a schematic configuration of the bearing holder 230.

The base plate 210 is a plate member, and has a rectangular shape in plan view. The base plate 210 has two screw holes 211 for fastening the angle 220 with the bolts 240. The screw holes 211 penetrate the base plate 210 in the thickness direction.

The angle 220 is a member to which the bearing holder 230 is attached. The angle 220 includes a first plate 221 and a second plate 222. The first plate 221 and the second plate 222 are connected to form a right angle. The second plate 222 has two through holes 223 associated with the screw holes 211 of the base plate 210. That is, the through holes 223 are holes in which the bolts 240 for attaching the angle 220 to the base plate 210 are inserted. The first plate 221 has the attachment hole 224 which penetrates the first plate 221 in the thickness direction and in which the bearing holder 230 is inserted.

The first plate 221 has screw holes 225 (four screw holes in this example) around the attachment hole 224. The screw holes 225 are holes for fastening the bearing holder 230 inserted in the attachment hole 224 to the angle 220 with the bolts 240. Two of the four screw holes 225 are arranged in the vertical direction, and the other two screw holes 225 are arranged in the horizontal direction. That is, the four screw holes 225 are arranged at intervals of 90 degrees in the circumferential direction of the attachment hole 224. The screw holes 225 penetrate the first plate 221 in the thickness direction of the first plate 221.

The bearing holder 230 is a component for holding the bearing 235. In this example, the bearing 235 is mounted on the inner side of the bearing holder 230 beforehand. The bearing 235 has a through hole 236 in which the shaft 250 is inserted. The bearing holder 230 includes a holder body 231 and a flange 232. The holder body 231 has a cylindrical shape. The flange 232 has an annular shape, and integrated with the outer periphery of an end portion of the holder body 231 in the axial direction. The holder body 231 is inserted in the attachment hole 224 of the angle 220. The outer diameter of the holder body 231 is approximately equal to the hole diameter of the attachment hole 224. The flange 232 has four through holes 233 associated with the screw holes 225 of the angle 220. That is, the through holes 233 are holes in which the bolts 240 for attaching the bearing holder 230 to the angle 220 are inserted. Each of the through holes 233 has a counterbore 234 that accommodates the head of an associated one of the bolts 240.

Each of the bolts 240 includes a bolt body 241 having an external thread and a columnar head 242 located at an end of the bolt body 241 (see FIG. 20 described later).

Actions of the hand 100 in the work will be hereinafter described in detail. In the following work, the controller 1200 moves the robot arm 1110 and the hand 100 in the manner described below.

—Placing Work—

Figure 18:
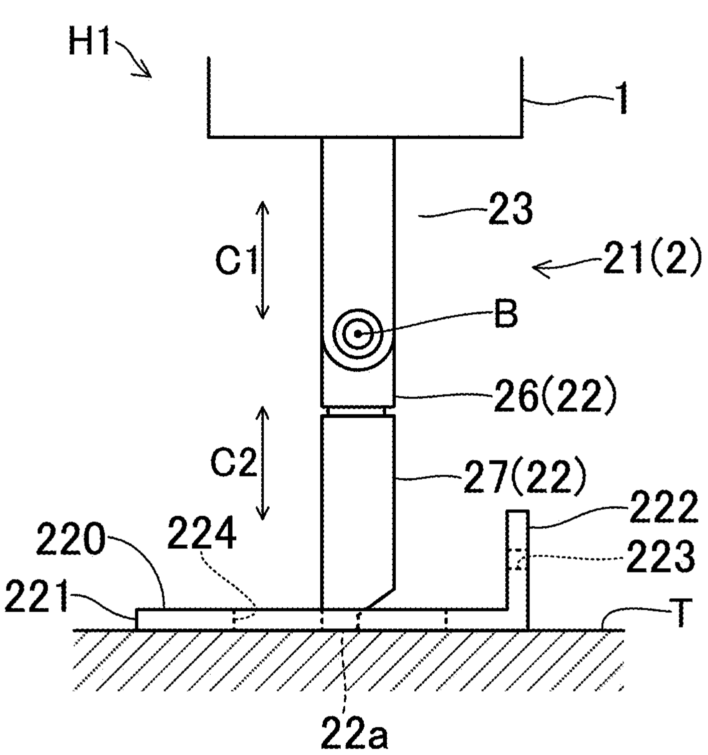
FIG. 18 is a schematic view illustrating a state where the angle is gripped by a first gripper.
Figure 19:
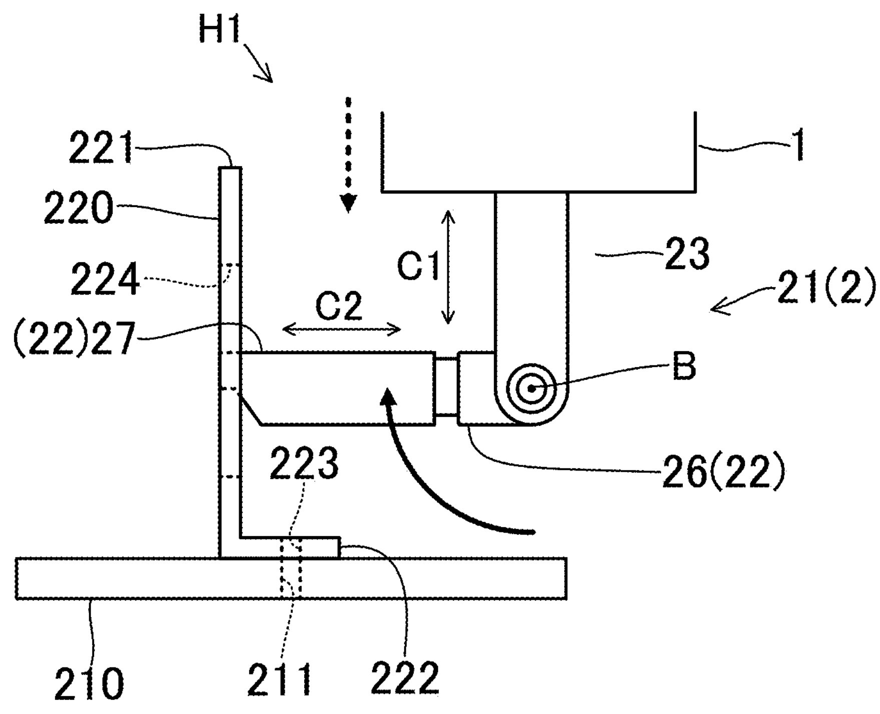
FIG. 19 is a schematic view illustrating a state where the angle is placed on the base plate by the first gripper.

FIG. 18 is a schematic view illustrating a state where the first gripper 2 grips the angle 220. FIG. 19 is a schematic view illustrating a state where the first gripper 2 places the angle 220 on the base plate 210. In this placing work, the base plate 210 is located on a frame or the like while expanding horizontally.

First, the angle 220 on a tray T is gripped by the first gripper 2 of the first hand H1. Specifically, the angle 220 is placed on the tray T with the first plate 221 expanding horizontally and the second plate 222 expanding vertically. The robot arm 1110 moves the hand 100 so that the first gripper 2 is located at the position of the angle 220 on the tray T. At this time, the two first fingers 21 of the first gripper 2 are in the extended state and in the open state. As illustrated in FIG. 18, the first gripper 2 moves the two first fingers 21 such that the two first fingers 21 approach each other in the opening/closing directions A, and grips the angle 220 with the two first fingers 21.

Next, the first gripper 2 places the angle 220 gripped by the first gripper 2 on the base plate 210. Specifically, the first gripper 2 causes the two first fingers 21 gripping the angle 220 to bend. Specifically, the first fingers 21 bend such that the first plate 221 extends vertically and the second plate 222 is located at the bottom. Then, as illustrated in FIG. 19, the robot arm 1110 moves the hand 100 and places the angle 220 gripped by the first gripper 2 on a predetermined position of the base plate 210. Specifically, the robot arm 1110 places the angle 220 on the base plate 210 such that the axes of the through holes 223 of the angle 220 coincide with the axes of the screw holes 211 of the base plate 210.

Through the foregoing action, the placing work is completed.

—First Fastening Work—

Figure 20:
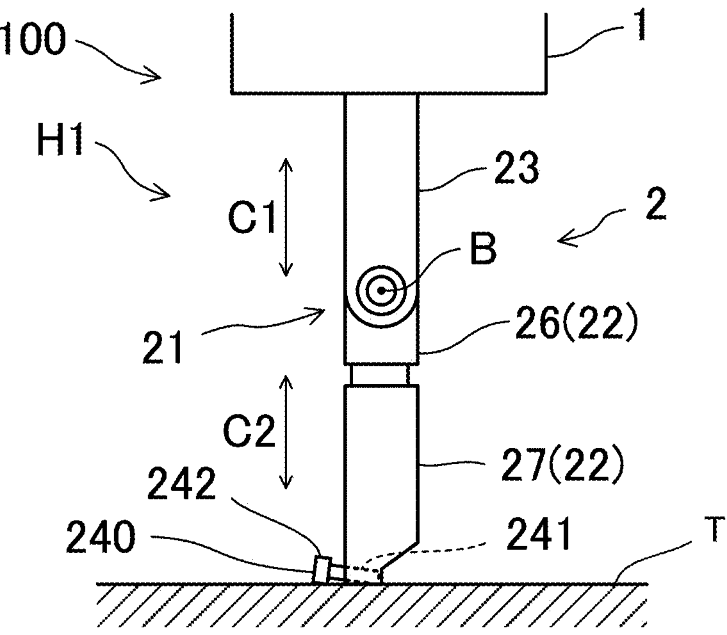
FIG. 20 is a schematic view illustrating a state where a bolt is gripped by the first gripper.
Figure 21:
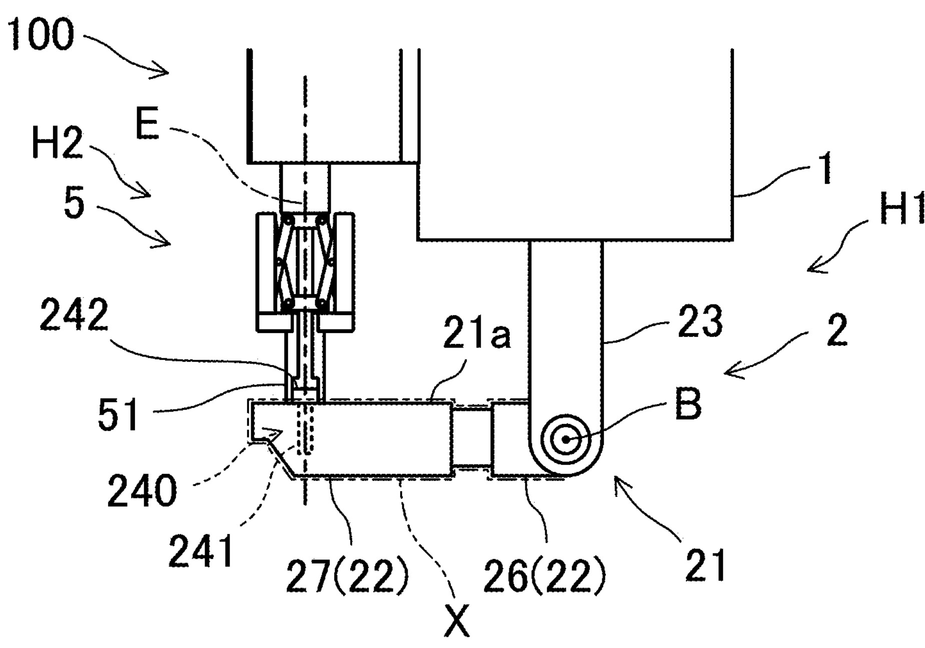
FIG. 21 is a schematic view illustrating a state where the second gripper receives the bolt from the first gripper.
Figure 22:
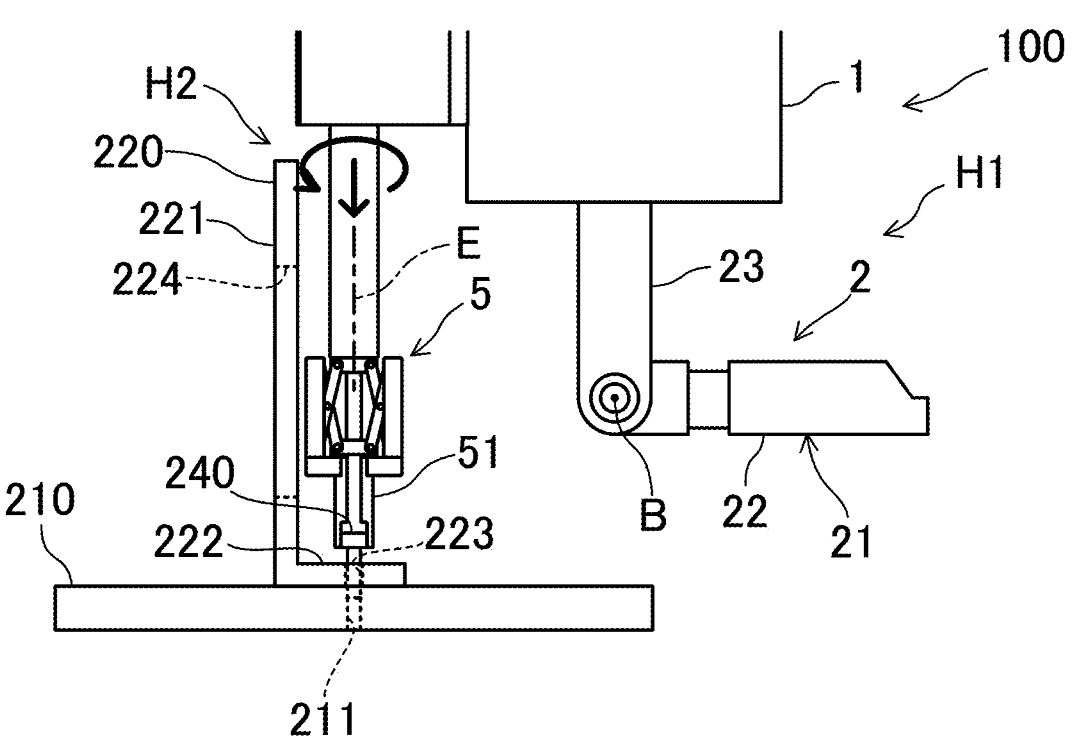
FIG. 22 is a schematic view illustrating a state where the second gripper screws the bolt into a screw hole.

FIG. 20 is a schematic view illustrating a state where the bolt 240 is gripped by the first gripper 2. FIG. 21 is a schematic view illustrating a state where the second gripper 5 receives the bolt 240 from the first gripper 2. FIG. 22 is a schematic view illustrating a state where the second gripper 5 screws the bolt 240 into the screw hole 211.

First, the first gripper 2 of the first hand H1 grips the bolt 240 on the tray T. Specifically, the robot arm 1110 moves the hand 100 such that the first gripper 2 is located at the position of the bolt 240 on the tray T. At this time, the two first fingers 21 of the first gripper 2 are in the extended state and in the open state. The bolt 240 is located between the two first fingers 21. The first gripper 2 moves the two first fingers 21 such that the two first fingers 21 approach each other in the opening/closing directions A and, as illustrated in FIG. the two first fingers 21 grip the bolt 240.

Next, the first gripper 2 delivers the bolt 240 to the second gripper 5 of the second hand H2. Specifically, the first gripper 2 causes the two first fingers 21 gripping the bolt 240 to bend. Specifically, the first gripper 2 causes the first fingers 21 to bend and moves the first part 22 to a position at which an imaginary region X defined by projecting the first part 22 in the opening/closing directions A interferes with the axis E. In FIG. 21, the imaginary region X is a region defined by projecting the first part 22 in a direction orthogonal to the drawing sheet. For easy illustration of the imaginary region X in FIG. 21, the imaginary region X is slightly larger than the first part 22 and indicated by a chain double-dashed line (the same holds for FIG. 28). As a result of moving the first part 22 to the position at which the imaginary region X interferes with the axis E, the bolt 240 is located near the axis E to which the three second fingers 51 advance or retract. Thereafter, the second hand H2 moves the second fingers 51 in the direction of the axis E such that the second fingers 51 are located at the position of the bolt 240 gripped by the first fingers 21. At this time, the three second fingers 51 are in the open state. The second hand H2 moves the three second fingers 51 toward each other and, as illustrated in FIG. 21, grips the bolt 240 with the three second fingers 51. The three second fingers 51 grip the head 242 of the bolt 240 with the axis of the bolt body 241 of the bolt 240 coinciding with the axis E.

Subsequently, the second hand H2 screws the bolt 240 into the screw hole 211. Specifically, the robot arm 1110 moves the hand 100 such that the bolt 240 gripped by the second gripper 5 is located above the screw hole 211 of the base plate 210, that is, above the through hole 223 of the angle 220. At this time, the robot arm 1110 makes the axis of the bolt body 241 substantially coincide with the axis of the through hole 223. The second hand H2 moves the second fingers 51 downward by the straight-moving actuator 6 while rotating the second fingers 51 by the rotation actuator 7. Accordingly, as illustrated in FIG. 22, the bolt 240 enters the through hole 223 and is further screwed into the screw hole 211. Lastly, the second hand H2 screws the bolt 240 into the screw hole 211 until the bolt 240 fixes the second plate 222 to the base plate 210.

This series of actions is performed on two screw holes 211 so that the angle 220 is finally fastened to the base plate 210 with the bolts.

Through the foregoing action, the first fastening work is completed.

—Holder Inserting Work—

Figure 23:
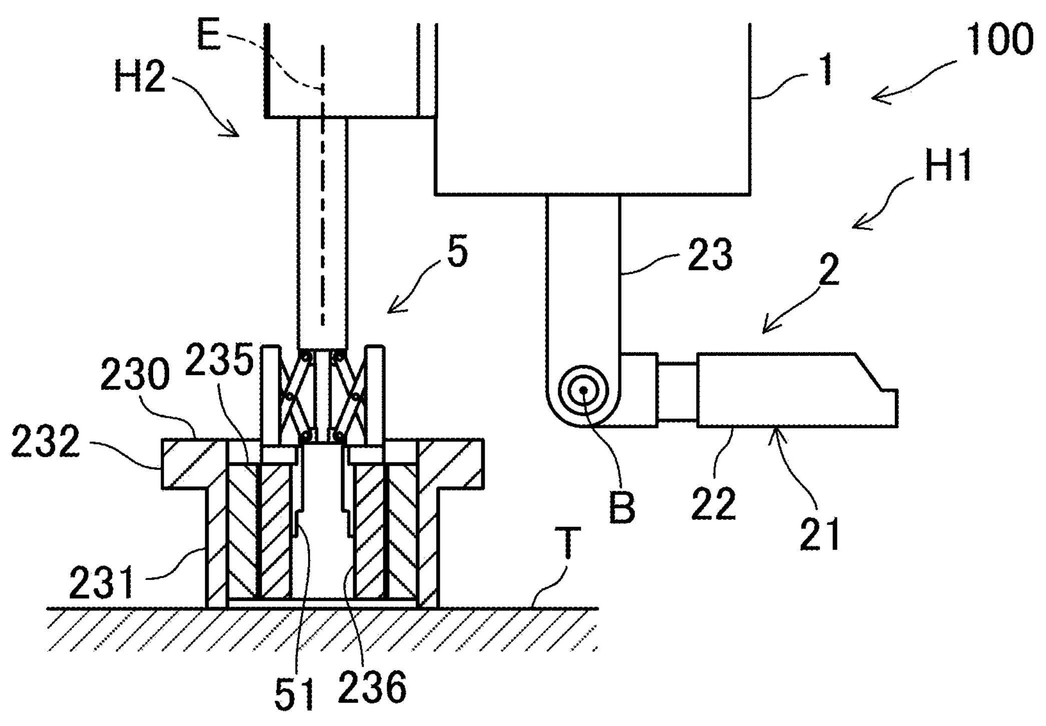
FIG. 23 is a schematic view illustrating a state where the second gripper grips the bearing holder.
Figure 24:
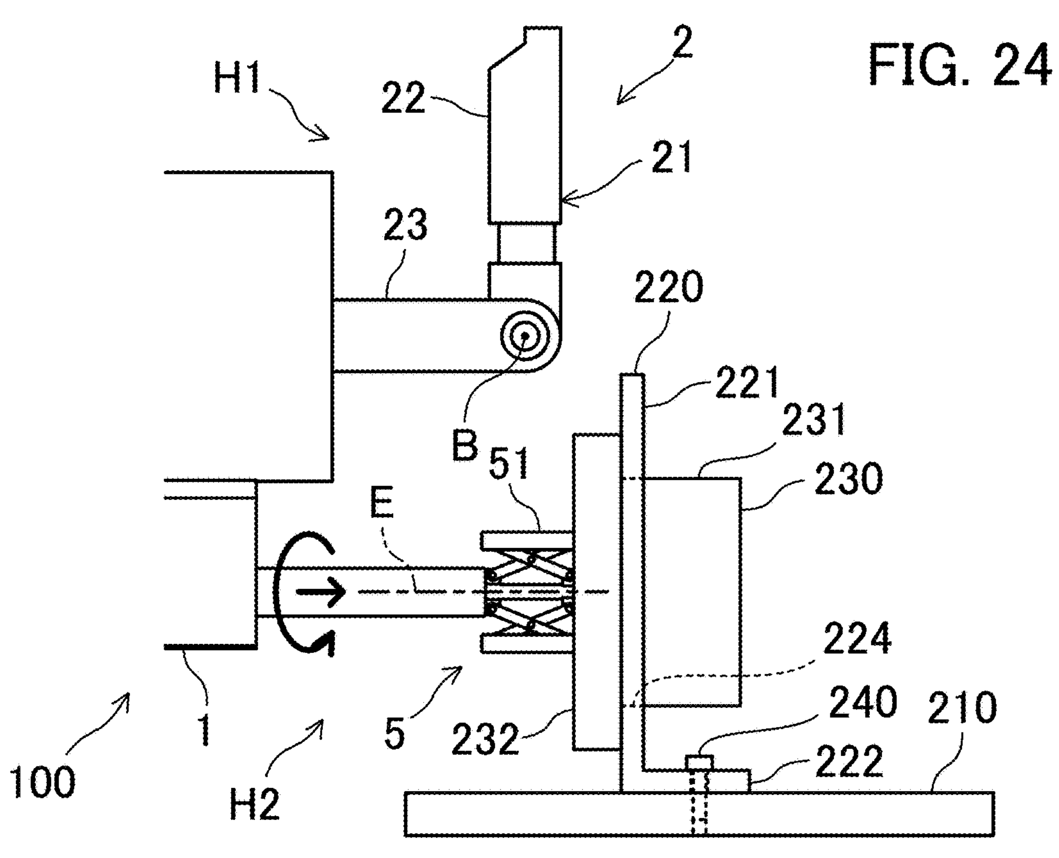
FIG. 24 is a schematic view illustrating a state where the second gripper inserts the bearing holder into the angle.

FIG. 23 is a schematic view illustrating a state where the second gripper 5 grips the bearing holder 230. FIG. 24 is a schematic view illustrating a state where the second gripper inserts the bearing holder 230 into the angle 220.

First, the second gripper 5 of the second hand H2 grips the bearing holder 230 on the tray T. Specifically, the robot arm 1110 moves the hand 100 such that the second gripper 5 is located at the position of the bearing holder 230 on the tray T. The bearing holder 230 is placed tray T with the flange 232 located above the holder body 231. The three second fingers 51 of the second gripper 5 in the closed state are inserted into the through hole 236 of the bearing 235 in the holder body 231. The second hand H2 opens the three second fingers 51 and, as illustrated in FIG. 23, brings the three second fingers 51 into contact with the inner peripheral surface of the through hole 236. In this manner, the second gripper 5 grips the bearing holder 230 with the three second fingers 51.

Thereafter, the second hand H2 fits the bearing holder 230 in the attachment hole 224 of the angle 220. Specifically, the robot arm 1110 moves the hand 100 such that the bearing holder 230 gripped by the second gripper 5 is located at the side of the attachment hole 224 of the angle 220. At this time, the robot arm 1110 makes the axis E of the second gripper 5, that is, the axis of the bearing holder 230, substantially coincide with the axis of the attachment hole 224. Then, the robot arm 1110 moves the hand 100 such that the holder body 231 of the bearing holder 230 approaches the attachment hole 224. Subsequently, the second hand H2 moves the second fingers 51 straight in the direction of the axis E by the straight-moving actuator 6 while rotating the second fingers 51 by the rotation actuator 7. Accordingly, the holder body 231 gradually enters the attachment hole 224. Finally, as illustrated in FIG. 24, the second hand H2 inserts the bearing holder 230 into the attachment hole 224 until the flange 232 of the bearing holder 230 contacts the first plate 221.

Through the foregoing action, the holder inserting work is finished.

—Positioning Work—

Figure 25:
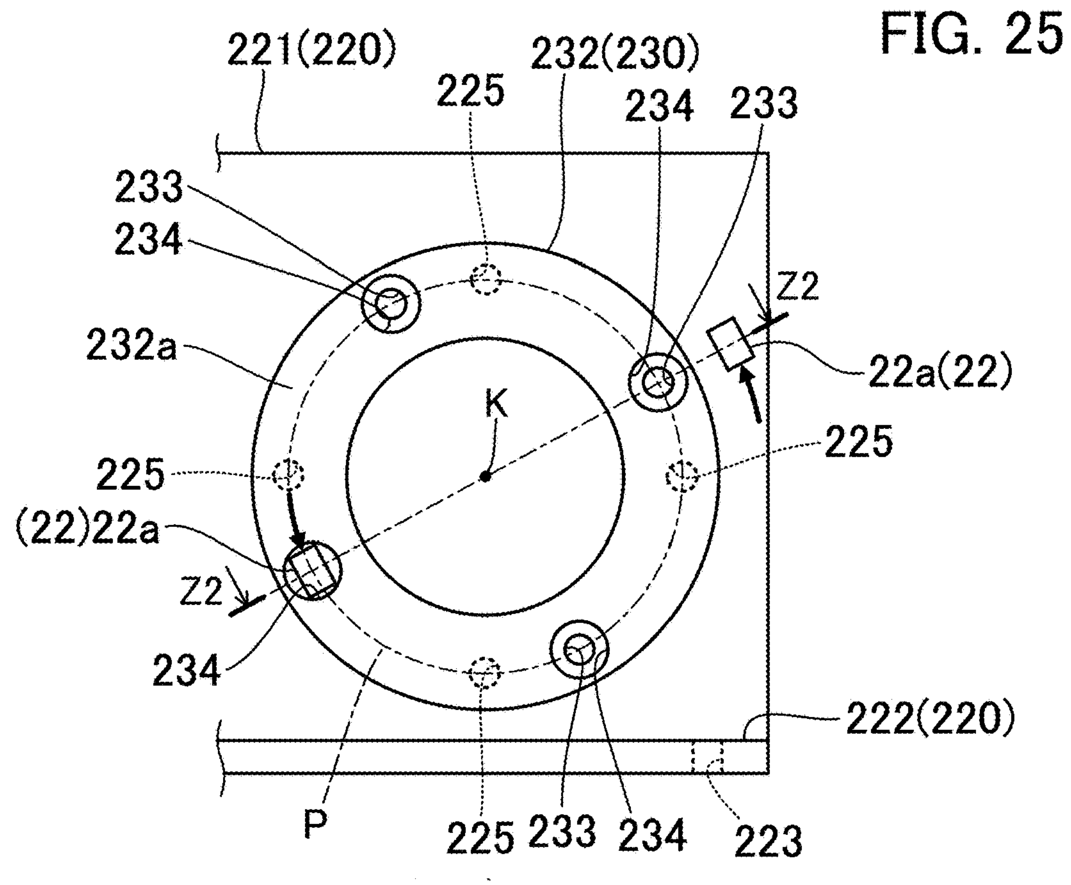
FIG. 25 is a schematic view illustrating a state of the bearing holder inserted in the angle when seen from an end surface side, and illustrates a state where the first finger is engaged with a counterbore.

FIG. 25 is a view illustrating a state of the bearing holder 230 inserted in the angle 220 when seen from an end surface 232*a*.

First, the hand 100 pushes the first gripper 2 against a predetermined position on the end surface 232*a* of the flange 232 of the bearing holder 230. The end surface 232*a* of the flange 232 herein is a surface of an end portion of the flange 232 in the direction of an axis k of the bearing holder 230. Specifically, the robot arm 1110 moves the hand 100 such that the first gripper 2 is located at a side of the end surface 232*a* of the flange 232. At this time, the two first fingers 21 of the first gripper 2 are in the extended state and in the open state. One of the two first fingers 21 is moved by the opening/closing actuators 3 to a position corresponding to the predetermined position in the opening/closing directions A described above. Then, the robot arm 1110 moves the hand 100 toward the flange 232, and pushes one of the first fingers 21 against a predetermined position on the end surface 232*a*.

Thereafter, the first gripper 2 of the first hand H1 rotates the bearing holder 230 for positioning. Specifically, the robot arm 1110 rotates the hand 100 such that one of the first fingers 21 of the first gripper 2 rotates about the axis K of the bearing holder 230. Then, as illustrated in FIG. 25, when the first finger 21 pushed against the end surface 232*a* rotates to the position of the through hole 233, this first finger 21 enters (is engaged with) the counterbore 234 of the through hole 233. Subsequently, the robot arm 1110 further rotates the hand 100 such that the axis of the through hole 233 of the flange 232 coincides with the axis of the screw hole 225 of the angle 220. In this manner, the bearing holder 230 is positioned at a predetermined rotation position. FIG. 25 shows distal ends of the first fingers 21 (i.e., the distal ends 22*a* of the first parts 22). FIG. 25 does not show the bearing 235.

Through the foregoing action, the positioning work is completed.

—Second Fastening Work—

Figure 26:
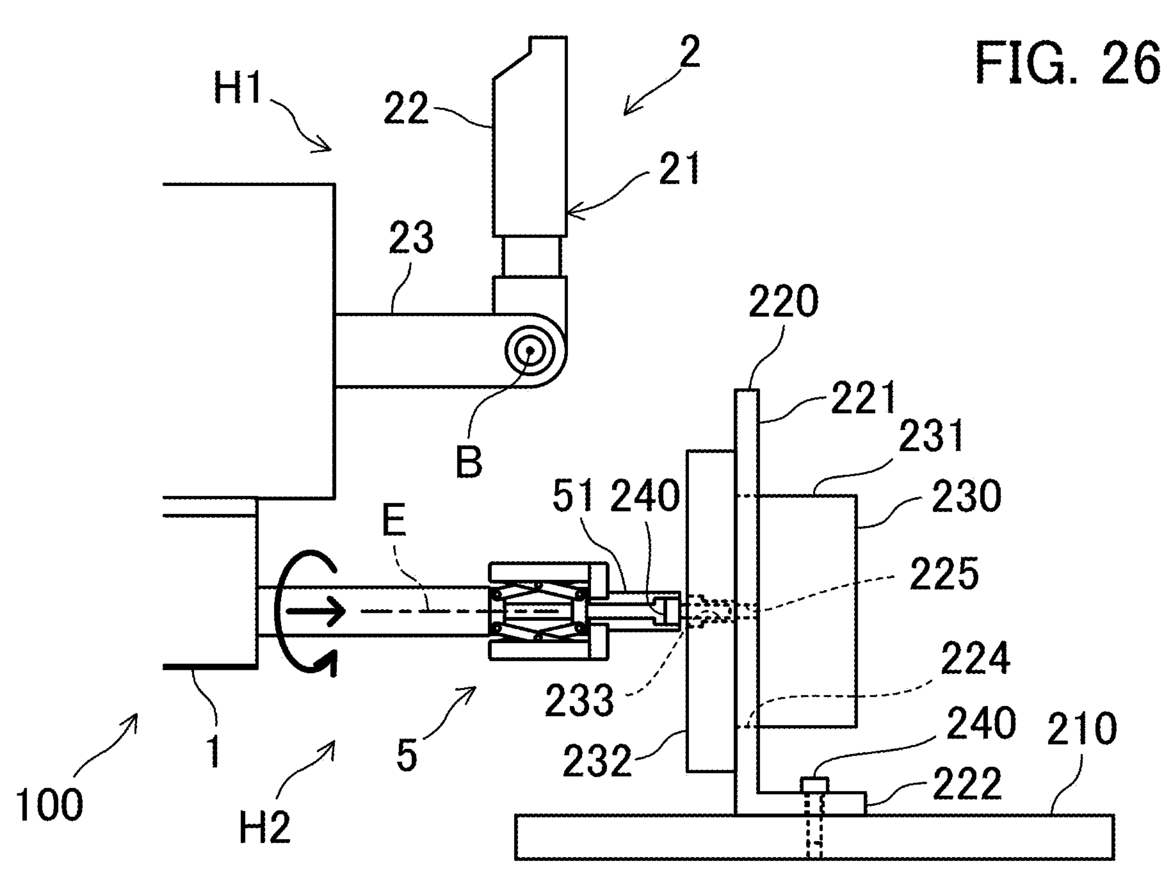
FIG. 26 is a schematic view illustrating a state where the second gripper screws the bolt into the screw hole of the angle.

FIG. 26 is a schematic view illustrating a state where the second gripper 5 screws the bolt 240 into the screw hole 225 of the angle 220.

First, the first gripper 2 of the first hand H1 grips the bolt 240 on the tray T. Next, the first gripper 2 delivers the bolt 240 to the second gripper 5 of the second hand H2. These actions are similar to those in the first fastening work.

Subsequently, the second hand H2 screws the bolt 240 into the screw hole 225 of the angle 220. Specifically, the robot arm 1110 moves the hand 100 such that the bolt 240 gripped by the second gripper 5 is located at a side of the screw hole 225 of the angle 220, that is, the through hole 233 of the bearing holder 230. At this time, the robot arm 1110 makes the axis E of the second gripper 5, that is, the axis of the bolt 240, substantially coincide with the axis of the screw hole 225. Then, the robot arm 1110 moves the hand 100 such that the bolt 240 is slightly inserted in the through hole 233. Subsequently, the second hand H2 moves the second fingers 51 straight in the direction of the axis E by the straight-moving actuator 6 while rotating the second fingers 51 by the rotation actuator 7. Accordingly, as illustrated in FIG. 26, the bolt 240 enters the through hole 233, and is further screwed into the screw hole 225. Lastly, the second hand H2 screws the bolt 240 into the screw hole 225 until the bolt 240 fixes the flange 232 of the bearing holder 230 to the angle 220.

This series of actions is performed on the four screw holes 225 so that the bearing holder 230 is finally fastened to the angle 220 with the bolts.

Through the foregoing action, the second fastening work is completed.

—Shaft Inserting Work—

Figure 27:
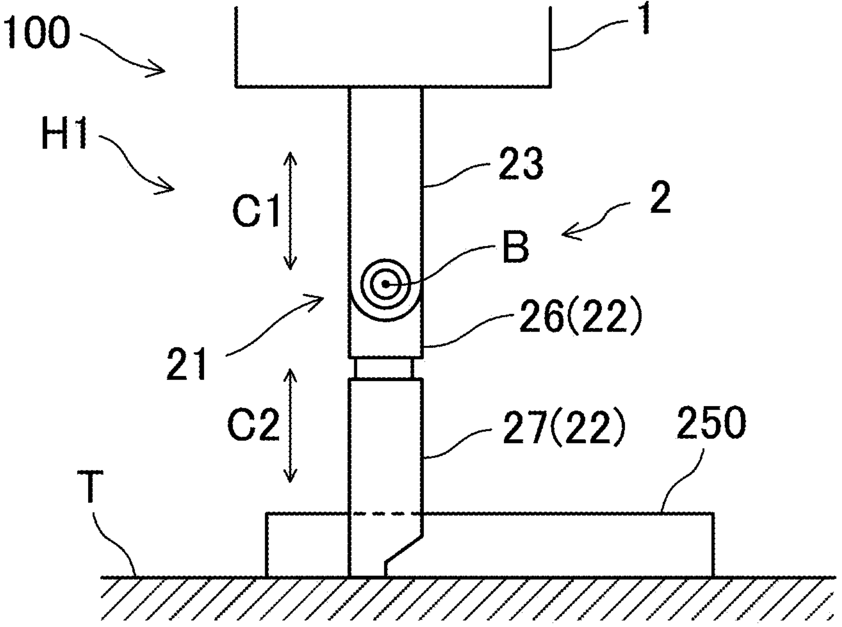
FIG. 27 is a schematic view illustrating a state where the first gripper grips a shaft.
Figure 28:
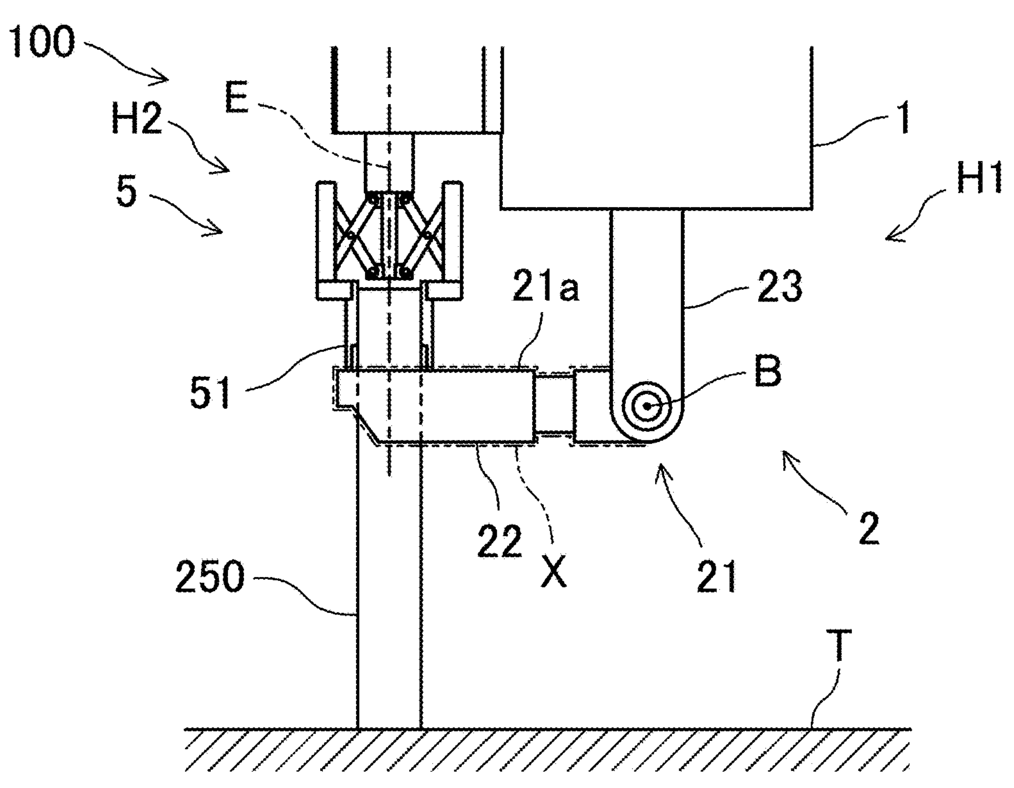
FIG. 28 is a schematic view illustrating a state where the second gripper receives the shaft from the first gripper.
Figure 29:
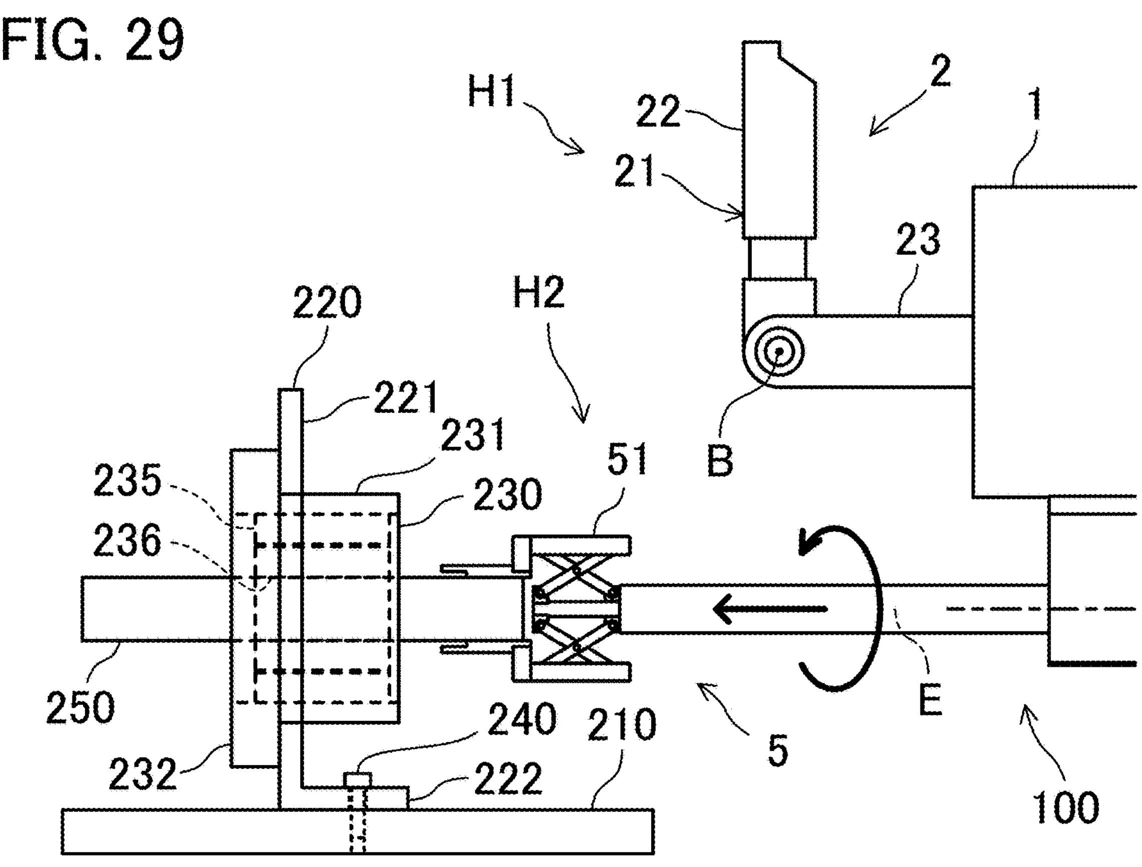
FIG. 29 is a schematic view illustrating a state where the second gripper inserts the shaft into a bearing of the bearing holder.

FIG. 27 is a schematic view illustrating a state where the shaft 250 is gripped by the first gripper 2. FIG. 28 is a schematic view illustrating a state where the second gripper 5 receives the shaft 250 from the first gripper 2. FIG. 29 is a schematic view illustrating a state where the second gripper 5 inserts the shaft 250 into the bearing 235 of the bearing holder 230.

First, the first gripper 2 of the first hand H1 grips the shaft 250 on the tray T. Specifically, the robot arm 1110 moves the hand 100 such that the first gripper 2 is located at the position of the shaft 250 on the tray T. At this time, the two first fingers 21 of the first gripper 2 are in the extended state and in the open. The shaft 250 is located between the two first fingers 21. The first gripper 2 moves the two first fingers 21 such that the two first fingers 21 approach each other in the opening/closing directions A and, as illustrated in FIG. 27, the two first fingers 21 grip the shaft 250.

Next, the first gripper 2 delivers the shaft 250 to the second gripper 5 of the second hand H2. Specifically, the first gripper 2 causes the two first fingers 21 gripping the shaft 250 to bend. Specifically, the first gripper 2 causes the first fingers 21 to bend and moves the first part 22 to a position at which the imaginary region X of the first part 22 interferes with the axis E. As a result, the shaft 250 is located near the axis E to which the three fingers 51 advance or retract. Thereafter, the second hand H2 moves the second fingers 51 in the direction of the axis E such that the second fingers 51 are located at positions corresponding to the shaft 250 gripped by the first fingers 21. At this time, the three second fingers 51 are in the open state. The second hand H2 moves the three second fingers 51 such that the three second fingers 51 approach each other and, as illustrated in FIG. 28, grips the shaft 250 with the three second fingers 51. The three second fingers 51 grip an end portion of the shaft 250 with the axis of the shaft 250 coinciding with the axis E.

Next, the second gripper 5 inserts the shaft 250 into the bearing 235 of the bearing holder 230. Specifically, the robot arm 1110 moves the hand 100 such that the shaft 250 gripped by the second gripper 5 is located at a side of the bearing holder 230. At this time, the robot arm 1110 makes the axis E of the second gripper 5, that is, the axis of the shaft 250, substantially coincide with the axis of the screw hole 236 of the bearing 235. Then, the robot arm 1110 moves the hand 100 such that the shaft 250 is slightly pushed against a vicinity of the through hole 236 of the bearing 235. Subsequently, the second hand H2 moves the second fingers 51 straight in the direction of the axis E by the straight-moving actuator 6 while rotating the second fingers 51 by the rotation actuator 7. Accordingly, the shaft 250 gradually enters the through hole 236. At this time, the second hand H2 releases gripping of the shaft 250 by the second gripper 5 and pushes the shaft 250 in the direction of the axis E by the pushing block 91 of the push actuator 9 to thereby insert the shaft 250 in the through hole 236 in some cases. Lastly, the second hand H2 stops insertion of the shaft 250 at the time when the shaft 250 is inserted in the through hole 236 to a predetermined amount.

Through the foregoing action, the shaft inserting work is completed, and assembly work of the bearing unit 200 is completed.

The thus-configured second hand H2 can smoothly perform coupling work of coupling one workpiece to the other workpiece in two workpieces to be coupled by insertion. For example, in the assembly work of the bearing unit 200 described above, the coupling work of the second hand H2 includes work of screwing the bolts 240 into the screw holes 211 of the base plate 210, work of fitting the bearing holder 230 in the attachment hole 224 of the angle 220, work of screwing the bolts 240 into the screw holes 225 of the angle 220, and work of fitting the shaft 250 in the through hole 236 of the bearing 235. In these works, the bearing holder 230, the bolts 240, and the shaft 250 are examples of the first workpiece, and the base plate 210, the angle 220, and the bearing 235 are examples of the second workpiece.

Figure 30:
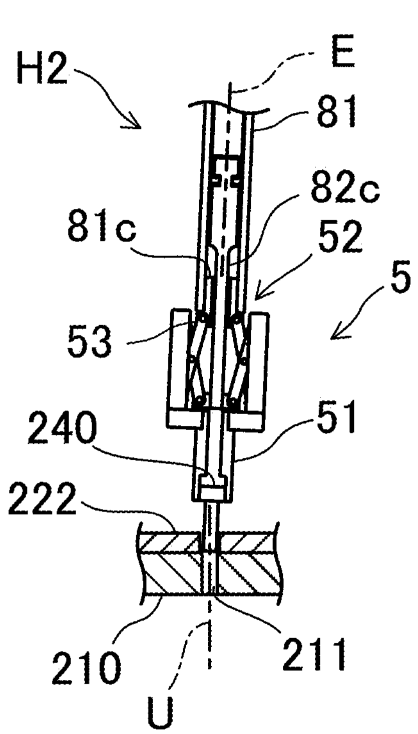
FIG. 30 is a cross-sectional view of the second gripper illustrating a state where the axis or the axis of the bolt tilts with respect to the axis of the screw hole.
Figure 31:
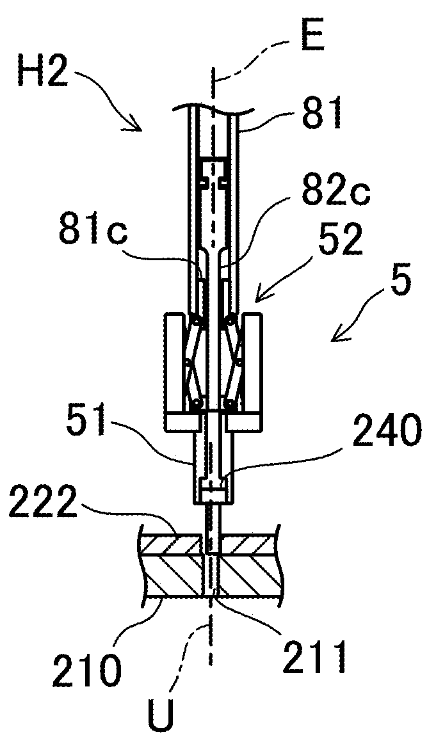
FIG. 31 is a cross-sectional view of the second gripper illustrating a state where the axis or the axis of the bolt is eccentric to the axis of the screw hole.

First, screwing work of screwing the bolts 240 into the base plate 210 will be described. The following description also holds for the screwing work of the bolts 240 to the angle 220. FIG. 30 is a cross-sectional view of the second gripper 5 illustrating a state where the axis E or the axis of the bolt 240 tilts with respect to an axis U of the screw hole 211. FIG. 31 is a cross-sectional view of the second gripper 5 illustrating a state where the axis E or the axis of the bolt 240 is eccentric to the axis U of the screw hole 211. FIG. 32 is a cross-sectional view of the second gripper 5 illustrating a state where the tilt of the axis of the bolt 240 is adjusted. FIG. 33 is a cross-sectional view of the second gripper 5 illustrating a state where axis eccentricity of the bolt 240 is adjusted.

In screwing the bolt 240 in the screw hole 211, the controller 1200 causes the second fingers 51 to grip the bolt 240 such that the axis of the bolt 240 (i.e., the axis of the bolt body 241) coincides with the axis E, and moves the second hand H2 such that the axis E of the second gripper 5 coincides with the axis of the screw hole 211. Accordingly, the axis of the bolt 240 coincides with the axis of the screw hole 211. From this state, the controller 1200 moves the second fingers 51 straight in the direction of the axis E while rotating the second fingers 31 about the axis E, thereby performing rotational coupling of screwing the bolt 240 to the screw hole 211. As long as the axis of the bolt 240 completely coincides with the axis of the screw hole 211, the bolt 240 is smoothly screwed into the screw hole 211.

However, depending on a positional shift of the second hand H2, a positional shift of the base plate 210, or a shift of the axis of the bolt 240 gripped by the second gripper 5 from the axis E, for example, the axis E or the axis of the bolt 240 might tilt (see FIG. 30) or might be eccentric (see FIG. 31) with respect to the axis U of the screw hole 211. In such cases, the bolt 240 might not be smoothly screwed.

On the other hand, the second gripper 5 is configured to adjust the tilt and position of a workpiece gripped by the second gripper 5. Specifically, the linkage 52 includes movable portions and sliding portions. For example, a clearance is present for rotation or sliding between an end of each of the links 53 and the second fingers 51. A clearance is present for rotation between an end of each of the links 53 and the outer cylinder 81 and the shaft 82. A small clearance is present between the link shaft 82*c* for moving the link 53 and the link block 81*c*. The links 53 are relatively thin and slender, and thus, have a nonnegligible degree of elasticity. These clearance and elasticity unique to the linkage 52 enables the second gripper to change the tilt and position of a workpiece gripped by the second gripper 5, albeit to some extent.

In addition, the bolt 240 is inserted in the screw hole 211 while rotating about the axis E. Thus, with a combination of rotation of the bolt 240 about the axis E and adjustment of tilt and position of a workpiece unique to the linkage 52 described above, the linkage 52 autonomously adjusts tilt and eccentricity of the bolt 240 such that the axis of the bolt 240 coincides with the axis U of the screw hole 211.

For example, in the case where the axis E or the axis of the bolt 240 tilts with respect to the axis U of the screw hole 211, the linkage 52 autonomously adjusts tilt of the bolt 240 such that the axis of the bolt 240 coincides with the axis of the screw hole 211, as illustrated in FIG. 32. In a case where the axis E or the axis of the bolt 240 is eccentric to the axis U of the screw hole 211, as illustrated in FIG. 33, the linkage 52 autonomously adjusts the position of the bolt 240 such that the axis of the bolt 240 coincides with the axis U of the screw hole 211. The linkage 52 can perform such autonomous adjustment of the tilt and position of the bolt 240 at the same time.

In the manner described above, the linkage 52 absorbs, that is, corrects, tilt and eccentricity of the axis of the bolt 240 so that the axis of the bolt 240 coincides with the axis U of the screw hole 211. As a result, the bolt 240 can be screwed smoothly.

In the case of coupling the bolt 240 to the base plate 210 by screwing with the straight-moving actuator 6 and the rotation actuator 7, the amount of movement of the second gripper 5 in the direction of the axis E per one turn about the axis E (hereinafter referred to as a "feed pitch") does not coincide with a screw pitch of the bolt 240 in some cases. In such cases, the bolt 240 might not be smoothly screwed.

Specifically, since the bolt 240 is gripped by the second fingers 51, the second fingers 51 and the bolt 240 basically rotate about the axis E at the same rotation speed (i.e., as long as no slip occurs between the second fingers 51 and the bolt 240). Thus, if the feed pitch is different from the pitch of the bolts 240, a difference occurs between the amount of movement of the second fingers 51 and the amount of movement of the bolt 240 in the direction of the axis E. Since the second fingers 51 move in the direction of the axis E by the feed screwer 63, the feed pitch is the pitch of the feed screws 64.

On the other hand, in a case where the feed pitch is larger than the pitch of the bolts 240, the damper 10 is elastically deformed to thereby adjust the amount of movement of the second fingers 51 in the direction of the axis E such that the amount of movement of the second fingers 51 in the direction of the axis E is equal to the amount of movement of the bolt 240 in the direction of the axis E. That is, the damper 10 absorbs a difference in the amount of movement in the direction of the axis E between the second gripper 5 and the bolt 240 caused by a difference between the feed pitch and the pitch of the bolts 240. Accordingly, the bolts 240 can be smoothly screwed.

In addition, after completion of screwing of the bolt 240, retightening of the bolt 240 can be performed. Specifically, after completion of screwing of the bolt 240, the robot arm 1110 moves the hand 100 to the retracting side in the direction of the axis E. After completion of screwing of the bolt 240, the damper 10 has been elastically deformed. Thus, when the hand 100 moves to the retracting side in the direction of the axis E, the damper 10 is first deformed to cancel elastic deformation, and the second gripper 5 does not move to the retracting side in the direction of the axis E. At this time, the second hand H2 moves the second gripper straight to the advancing side in the direction of the axis E while rotating the second gripper about the axis E. It should be noted that the robot arm 1110 moves the hand 100 such that the amount of movement of the hand 100 to the retracting side in the direction of the axis E is larger than the amount of movement of the second gripper 5 to the advancing side in the direction of the axis E. As a result, for a while after the hand 100 has started moving to the retracting side in the direction of the axis E, the damper 10 is deformed to cancel elastic deformation. During this deformation, the second gripper 5 rotates about the axis E while gripping the bolt 240. Accordingly, the bolt 240 is retightened. Then, when the damper 10 returns to the state before elastic deformation, the second gripper 5 starts moving to the retracting side in the direction of the axis E. In the meantime, the second fingers 51 leave the bolt 240, and move away from the bolt 240 in the direction of the axis E. Through the foregoing action, the screwing work is completed.

Next, screwing work of the bolt 240 to the angle 220 will be described.

The screwing work of the bolt 240 to the angle 220 is basically the same as screwing work of the bolt 240 to the base plate 210. That is, in a case where the axis E or the axis of the bolt 240 tilts or is eccentric with respect to the axis of the screw hole 225, rotation of the bolt 240 about the axis E and an adjustment function of tilt and eccentricity of the axis of the bolt 240 by the linkage 52 cause the axis of the bolt 240 to coincide with the axis of the screw hole 225. As a result, the bolt 240 can be screwed smoothly. In the case where the feed pitch is larger than the pitch of the bolts 240, the damper 10 is elastically deformed to thereby adjust the amount of movement of the second fingers 51 in the direction of the axis E such that the amount of movement of the second fingers 51 in the direction of the axis E is equal to the amount of movement of the bolt 240 in the direction of the axis E. Accordingly, the bolt 240 can be screwed smoothly.

In addition, even in a case where the pitch of the bolts 240 for the screw holes 225 is different from the pitch of the bolts 240 for the screw holes 211, one second hand H2 can be used for both types of the bolts 240 and enables screwing the bolts 240. That is, the types of the bolts 240 include bolts with various pitches. However, for the bolts 240 having a smaller pitch than the feed pitch, the damper 10 adjusts the amount of movement of the second fingers 51 in the direction of the axis E to thereby enable smooth screwing of the bolts 240 with various pitches.

Figure 34:
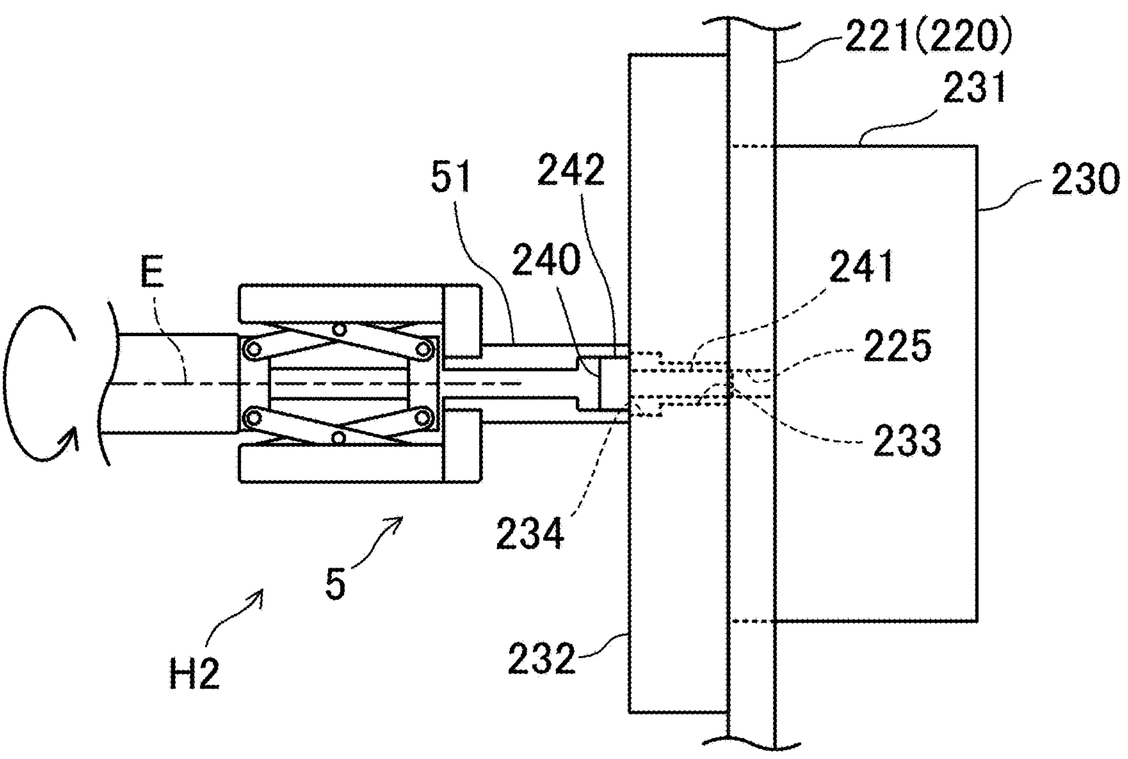
FIG. 34 is a schematic view illustrating a state where the second fingers contact a flange in inserting the bolt in the screw hole of the angle.

Even in the presence of the counterbore 234, the second hand H2 can smoothly screw the bolt 240. FIG. 34 is a schematic view illustrating a state where the second fingers 51 contact the flange 232 in inserting the bolt 240 in the screw hole 225 of the angle 220. FIG. is a schematic view illustrating a state where the second fingers 51 screw the bolt 240 into the screw hole 225 of the angle 220 while sliding the head 242 of the bolt 240.

Specifically, in general, a gap between the head 242 of the bolt 240 and the counterbore 234 in the radial direction about the axis E is small, and it is difficult for the second fingers 51 to enter the gap. In view of this, as illustrated in FIG. 34, the second fingers 51 do not enter the counterbore 234, and stops moving in the direction of the axis E when contacting the flange 232, and continues only to rotate about the axis E. In the second hand H2, the straight-moving actuator 6 and the rotation actuator 7 are integrally configured, and rotation of the second fingers 51 about the axis E and movement of the second fingers 51 in the direction of the axis E are performed at the same time. However, since the damper 10 absorbs movement of the second fingers 51 in the direction of the axis E, the second fingers 51 can rotate about the axis E while stopping movement in the direction of the axis E at the flange 232. In this state, the bolt 240 is also screwed into the screw hole 225 by continuing rotation about the axis E. At this time, a slip occurs between the second fingers 51 and the head 242, and the bolt 240 moves in the direction of the axis E relative to the second fingers 51. Although a slip also occurs in the rotation direction about the axis E, rotation of the second fingers 51 is transferred to the bolt 240 by a friction force.

Figure 35:
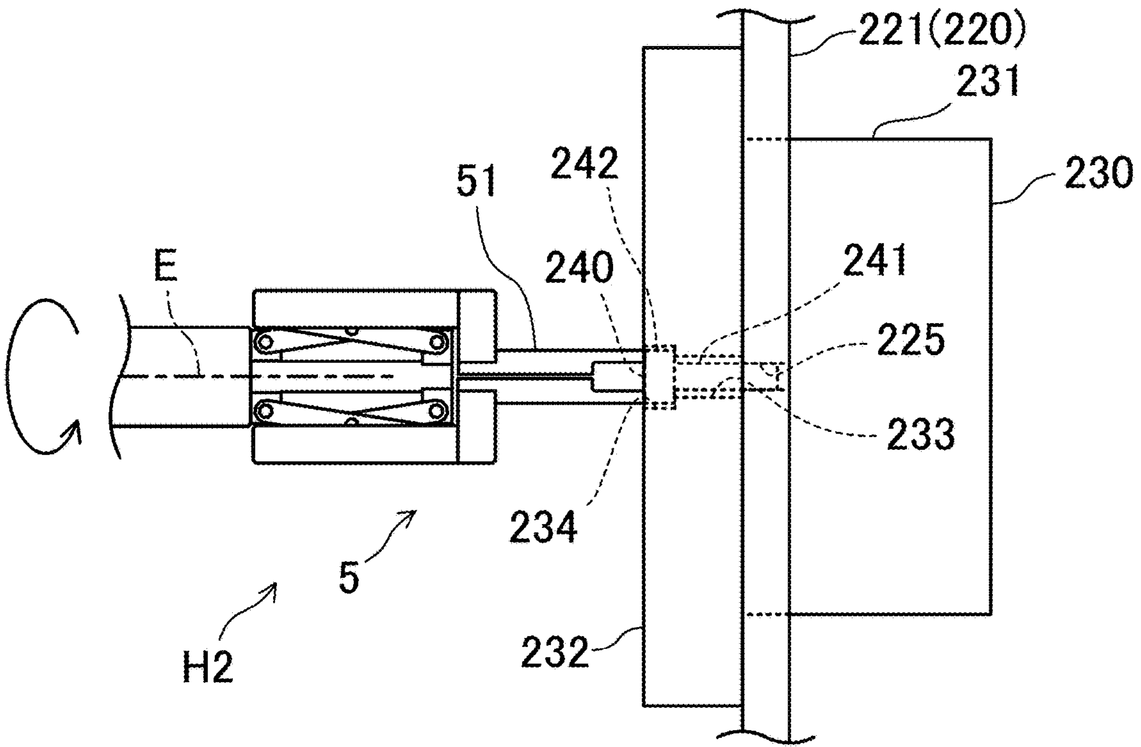
FIG. 35 is a schematic view illustrating a state where the second fingers screw the bolt into the screw hole of the angle while sliding the head of the bolt.

When screwing of the bolt 240 continues, the bolt 240 is then released from gripping by the second fingers 51. After the second fingers 51 stop gripping the head 242 of the bolt 240, as illustrated in FIG. 35, the second fingers 51 move to the closing side in the radial direction about the axis E, and is brought into contact with an end surface (i.e., end surface in the direction of the axis E) of the head 240. In this state, driving of the second fingers 51 by the straight-moving actuator 6 and the rotation actuator 7 also continues. Movement of the second fingers 51 in the direction of the axis E is absorbed by the damper 10. However, an elastic force due to elastic deformation of the damper 10 is exerted on the bolt 240 through the second fingers 51. Thus, the second fingers 51 press the head 242 to the advancing side in the direction of the axis E while sliding with respect to the head 242 to rotate about the axis E. That is, the second fingers 51 slide to rotate about the axis E with respect to the head 242 under a strong friction force. As a result, the bolt 240 is rotated about the axis E and gradually screwed into the screw hole 225.

In the manner described above, after gripping of the bolt 240 by the second fingers 51 is disabled by the counterbore 234, the second fingers 51 slide to rotate about the axis E on the end surface of the head 242 of the bolt 240 so that the second hand H2 can thereby screw the bolt 240 into the screw hole 225.

Thereafter, fitting work of fitting the shaft 250 in the bearing 235 will be described.

In the fitting work of the shaft 250, in the same manner as in the screwing work of the bolt 240, in the case where the axis E or the axis of the shaft 250 tilts with respect to the axis of the through hole 236, the axis of the shaft 250 coincides with the axis of the through hole 236 by rotation of the shaft 250 about the axis E and the adjustment function of tilt and eccentricity of the axis of the shaft 250 by the linkage 52. As a result, fitting of the shaft 250 can be performed smoothly.

In addition, in the fitting work of the shaft 250, the shaft 250 might be stuck on the inner peripheral surface of the through hole 236. However, the second hand H2 not only simply pushes the shaft 250 in the direction of the axis E but also pushes the shaft 250 in the direction of the axis E while rotating the shaft 250 about the axis E. Accordingly, occurrence of the sticking can be reduced.

In addition, since the second hand H2 includes the damper 10, in the case where the shaft 250 is subjected to an excessive reaction force, the damper 10 can absorb this reaction force. Accordingly, excessive pushing of the shaft 250 against the inner peripheral surface of the through hole 236 can be prevented. This can also reduce occurrence of the sticking.

Figure 36:
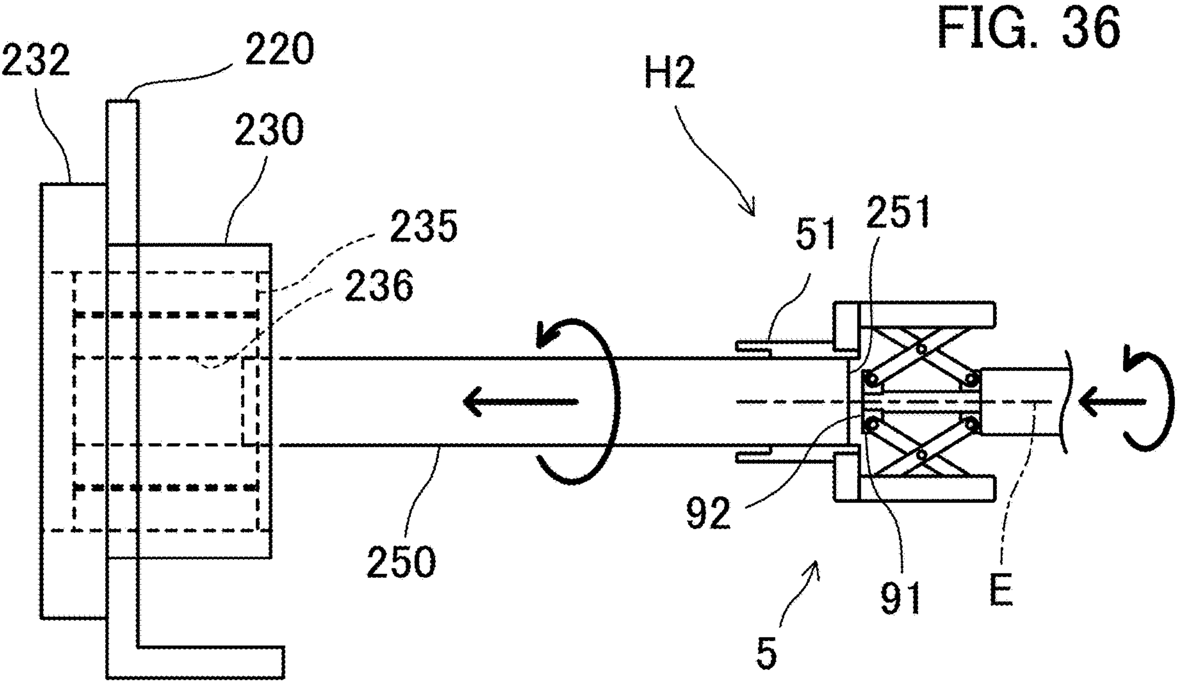
FIG. 36 is a schematic view illustrating a state where a shaft 250 is rotationally inserted in the bearing holder 230.
Figure 37:
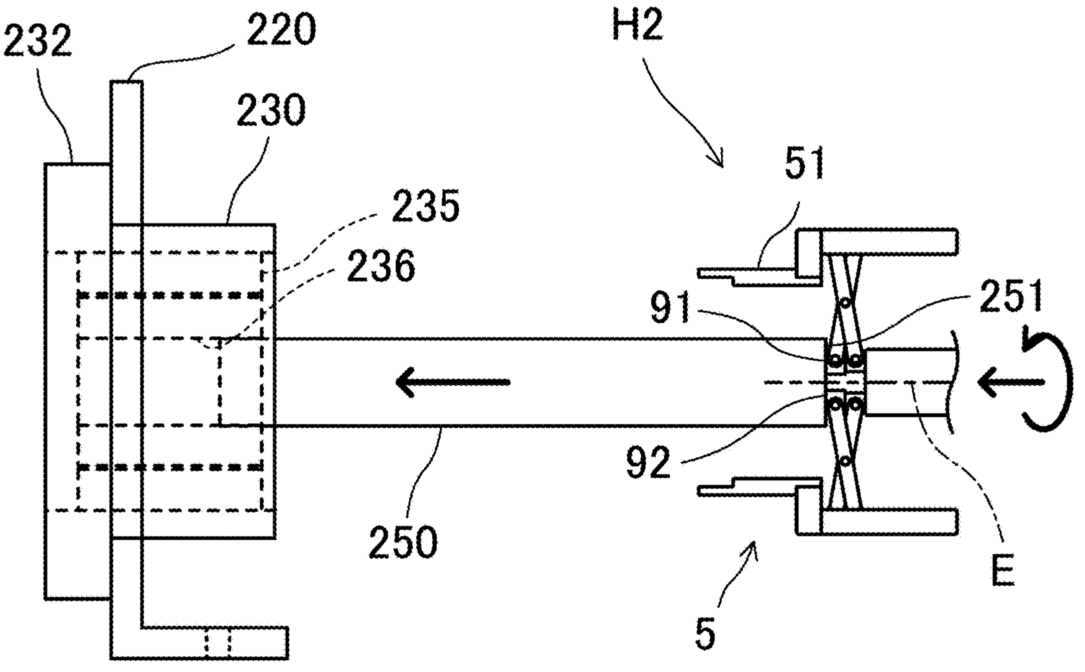
FIG. 37 is a schematic view illustrating a state where the shaft 250 is inserted in the bearing holder 230 by pushing.

In regard to fitting of a workpiece, the second hand H2 can switch between rotational insertion of inserting the workpiece in the hole while rotating the workpiece about the axis E and pushing insertion of inserting the workpiece in the hole by pushing the workpiece in the direction of the axis E. The rotational insertion is an example of rotational coupling. The pushing insertion is an example of pushing coupling. FIG. 36 is a schematic view illustrating a state where the shaft 250 is rotationally inserted in the bearing holder 230. FIG. 37 is a schematic view illustrating a state where the shaft 250 is inserted in the bearing holder 230 by pushing.

Specifically, as described above, the controller 1200 causes the second fingers 51 to grip the shaft 250 and moves the second fingers 51 straight in the direction of the axis E while rotating the second fingers 51 about the axis E, thereby performing rotational insertion of the shaft 250 in the through hole 236. On the other hand, the controller 1200 pushes the shaft 250 in the direction of the axis E by the pushing block 91 without gripping the shaft 250 by the second fingers 51, thereby performing pushing insertion of the shaft 250 in the through hole 236.

As an example of performing rotational insertion and pushing insertion, the controller 1200 performs an initial stage of insertion of the shaft 250 in the through hole 236 by rotational insertion, and then performs pushing insertion.

Specifically, first, as illustrated in FIG. 36, the controller 1200 causes the second fingers 51 to grip the shaft 250 and moves the second fingers 51 straight in the direction of the axis E while rotating the second fingers 51 about the axis E. Accordingly, the shaft 250 is inserted into the through hole 236 while rotating about the axis E.

When a portion of the shaft 250 is inserted in the through hole 236, that is, the shaft 250 is inserted in the through hole 236 to a predetermined length, the controller 1200 switches rotational insertion to pushing insertion. The controller 1200 cancels gripping of the shaft 250 by the second fingers 51. At the same time, the controller 1200 causes the push actuator 9 to move the pushing block 91 to the advancing side in the direction of the axis E so that the pushing block 91 is brought into contact with the shaft 250. As illustrated in FIG. 37, the controller 1200 continues movement of the pushing block 91 to the advancing side in the direction of the axis E so that the pushing block 91 pushes the shaft 250 in the direction of the axis E, that is, toward the axis of the through hole 236. When the shaft 250 is inserted in the through hole 236 to the remaining length in the total insertion length, the controller 1200 finishes pushing insertion of the shaft 250. Through the foregoing action, the fitting work of the shaft 250 in the through hole 236 is completed.

In pushing insertion, the pushing surface 92 of the pushing block 91 contacts an end surface (end surface opposite to the through hole 236 in the axial direction) 251 of the shaft 250 in the axial direction of the shaft 250. The pushing surface 92 is orthogonal to the axis E. In this example, the end surface 251 of the shaft 250 is orthogonal to the axis of the shaft 250. Thus, when the pushing surface 92 is brought into surface contact with the end surface 251 of the shaft 250, the axis of the shaft 250 coincides with, or at least parallel to, the axis E. In this state, when the pushing block 91 moves in the direction of the axis E, the shaft 250 is pushed in the axial direction of the shaft 250. As a result, the shaft 250 is smoothly inserted in the through hole 236.

In the manner described above, in the pushing insertion, the axis of the shaft 250 can be made parallel to (including coincide with) the axis E, which is the pushing direction, advantageously. On the other hand, in the rotational insertion, tilt and eccentricity of the axis of the shaft 250 can be absorbed by the linkage 52 and the sticking can be reduced by rotating the shaft 250 about the axis E in moving in the direction of the axis E, advantageously.

In this example, in starting insertion of the shaft 250 in the through hole 236, the controller 1200 performs rotational insertion. Before insertion of the shaft 250 in the through hole 236, the axis of the shaft 250 might tilt or be eccentric to the axis of the through hole 236. In particular, as in this example, in the case of supporting the shaft center 250 by the second fingers 51 in a cantilever manner with the axis of shaft 250 kept horizontally, the axis of the shaft 250 might tilt. In view of this, the controller 1200 performs rotational insertion at start of insertion of the shaft 250 in the through hole 236. Accordingly, tilt of the axis of the shaft 250 is absorbed by the linkage 52 so that the shaft 250 can be smoothly inserted in the through hole 236. When the shaft 250 is inserted in the through hole 236 to some extent, the axis of the shaft 250 substantially coincides with the axis of the through hole 236. Thus, after the shaft 250 has been inserted in the through hole 236 to some extent, the controller 1200 performs pushing insertion. Accordingly, the shaft 250 can be smoothly inserted in the through hole 236 with the axis of the shaft 250 kept in parallel with the axis E.

As another example, the controller 1200 alternately performs rotational insertion and pushing insertion. Specifically, the length of insertion in performing each of rotational insertion and pushing insertion is previously determined.

When the controller 1200 performs rotational insertion of the shaft 250 to a predetermined insertion length, the controller 1200 switches the rotational insertion to the pushing insertion. Next, when the controller 1200 performs the pushing insertion of the shaft 250 to a predetermined insertion length, the controller 1200 switches the pushing insertion to rotational insertion. The controller 1200 repeats these actions.

The sticking, for example, of the shaft 250 occurs because of various reasons. Which one of the rotational insertion and the pushing insertion is effective for preventing the sticking depends on the situation. In view of this, the rotational insertion and the pushing insertion are alternately repeated so that one of the rotational insertion and the pushing insertion works effectively to prevent or cancel the sticking, and smooth insertion of the shaft 250 can be achieved.

The insertion length in the rotational insertion and the insertion length in the pushing insertion may be equal to or different from each other. The insertion lengths in repetitive rotational insertions may be equal or different. The insertion lengths of repetitive pushing insertions may be equal or different.

In the two examples described above, switching between rotational insertion and pushing insertion is not limited to switching based on the insertion length of the shaft 250. For example, switching between rotational insertion and pushing insertion may be performed based on an insertion time. Alternatively, switching between rotational insertion and pushing insertion may be performed based on the magnitude or variations of the driving force. That is, rotational insertion may be switched to pushing insertion when the driving force of the rotational insertion increases to a predetermined level or more. Pushing insertion may also be switched to rotational insertion when the driving force of the pushing insertion increases to a predetermined level or more. In this example, the driving forces of rotational insertion and pushing insertion are determined based on a rotation torque of the fourth motor 61. Alternatively, in a configuration in which a force sensor is disposed between the robot arm 1110 and the hand 100, switching may be performed between rotational insertion and pushing insertion based on a detection result of the force sensor.

The second hand H2 has various advantages in addition to coupling work of two workpieces.

For example, the second hand H2 can also perform work smoothly in small space. Specifically, the links 53 are disposed at the inner side of the three second fingers 51 in the radial direction about the axis E. Thus, dimensions, especially dimensions in the radial direction about the axis E, of the second gripper 5 can be reduced. In the case of closing the three second fingers 51, the links 53 are also disposed at the inner side of the three second fingers 51.

For example, in screwing the bolt 240 in first fastening work (see FIG. 22), the first plate 221 of the angle 220 is located near the screw hole 211. For example, in the case of guiding fingers by, for example, a linear guide, the linear guide is present at the outer side of the fingers. Thus, dimensions, that is, the outer shape, of a mechanism around the fingers including the linear guide increase. It is difficult for the hand with such a configuration to perform work by inserting the fingers in small space such as space near the first plate 221.

On the other hand, in the second gripper 5, the three second fingers 51 grip the bolt 240 and the links 53 are disposed at the inner side of the three second fingers 51. The links 53 do not project outward from the three second fingers 51. Thus, the three second fingers 51 gripping the bolt 240 can approach the screw hole 211 from above without interference with the first plate 221, and screw the bolt 211. In this manner, the second hand H2 can smoothly screw the bolt 240 even in small space.

In addition, since the second hand H2 further includes the damper 10, the second hand H2 can absorb shock not only in the insertion of a workpiece in the hole but also in gripping the workpiece. Specifically, in gripping a workpiece placed on a place such as the tray T by the second fingers 51, as in gripping the bolt 240 in the first fastening work or in gripping the shaft 250 in the shaft inserting work, the controller 1200 causes the second fingers 51 to slide on the tray T such that the damper 10 is elastically deformed. In this example, the second fingers 51 are opened and closed by the linkage 52 such that the distal ends of the second fingers 51 draw an arc trajectory. That is, the distal ends of the second fingers 51 are at different positions in the direction of the axis E in accordance with the opening/closing state of the second fingers 51. The distal ends of the second fingers 51 when the second fingers 51 are closed most are located at the most advancing side in the direction of the axis E. In moving the second fingers 51 to the position of the workpiece, that is, the bolt 240 or the shaft 250, with the second fingers 51 open, the controller 1200 causes the second fingers 51 to approach the tray T to a position at which the arc trajectory drawn by the distal ends of the second fingers 51 interferes with the tray T. The controller 1200 closes the second fingers 51 from this state so that the second fingers 51 are thereby brought into contact with the tray T in the middle of movement in the closing direction. After the second fingers 51 have been brought into contact with the tray T, the damper 10 is elastically deformed, and the second fingers 51 slide on the surface of the tray T. In this manner, the second fingers 51 can reliably grip the workpiece on the tray T. Since the second fingers 51 grip the workpiece while sliding on the surface of the tray T, even a thin workpiece such as a washer can be reliably gripped. The place on which the workpiece is placed is not limited to the tray T. As illustrated in FIG. 21, similar advantages can also be obtained in such a case of gripping the bolt 240 placed on the first fingers 21.

In gripping the workpiece, the second hand H2 grips the workpiece with the axis E located at a center of gripping (hereinafter such gripping will be referred to as "centering gripping"). For example, in first fastening work and second fastening work, when the second gripper 5 receives the bolt 240 from the first fingers 21, the second gripper 5 grips the bolt 240 with the axis E located at a center of gripping. At this time, the outer shape of the bolt 240 seen in the direction of the axis E is a circular shape of the head 242. Thus, when the second gripper 5 performs centering gripping of the head 242, the head 242 is gripped such that the axis of the bolt 240 coincides with the axis E. In shaft inserting work, when the second gripper receives the shaft 250 from the first fingers 21, the second gripper 5 grips the shaft 250 with the axis E located at a center of gripping. At this time, the outer shape of the shaft 250 seen in the direction of the axis E is a circular shape. Thus, when the second gripper 5 performs centering gripping of the shaft 250, the shaft 250 is gripped such that the axis of the shaft 250 coincides with the axis E.

In the manner described above, the second hand H2 (hand) that grips the first workpiece and couples the first workpiece to the second workpiece, where the first workpiece (e.g., the bolt 240 or the shaft 250) and the second workpiece (e.g., the base plate 210 or the angle 220) being to be coupled to each other by insertion, includes: the second gripper 5 (gripper) that grips the first workpiece; the straight-moving actuator 6 that moves the second gripper 5 straight in the direction of the predetermined axis E; and the rotation actuator 7 that rotates the second gripper 5 about the axis E, and the second gripper 5 includes the three second fingers 51 (at least two fingers) that grip the first workpiece and the linkage 52 that opens and closes the three second fingers 51.

In other words, the second hand H2 that grips the first workpiece and couples the first workpiece to the second workpiece in the first and second workpieces to be coupled to each other by insertion includes: the second gripper 5 that grips the first workpiece; the straight-moving actuator 6 that moves the second gripper 5 straight in the direction of the predetermined axis E; and the rotation actuator 7 that rotates the second gripper 5 about the axis E, and the second gripper 5 includes an adjuster that adjusts tilt and eccentricity of the first workpiece with respect to the axis E. That is, the linkage 52 that opens and closes the three second fingers 51 for gripping the first workpiece is an example of the adjuster.

The robot system 1000 that couples the first workpiece to the second workpiece, the first workpiece and the second workpieces being to be coupled to each other by insertion, includes: the second hand H2; and the controller 1200 that controls the second hand H2, the second hand H2 includes the second gripper 5 that grips the first workpiece, the straight-moving actuator 6 that moves the second gripper 5 straight in the direction of the predetermined axis E, and the rotation actuator 7 that rotates the second gripper 5 about the axis E, the second gripper includes the three second fingers 51 that grip the first workpiece and the linkage 52 that opens and closes the three second fingers 51, and the controller 1200 moves the second gripper 5 gripping the first workpiece straight in the direction of the axis E by the straight-moving actuator 6 while rotating the second gripper 5 about the axis E by the rotation actuator 7, thereby performing rotational coupling of coupling the first workpiece to the second workpiece. A method for controlling the second hand H2 including the three second fingers 51 that grip a workpiece and the linkage 52 that opens and closes the three second fingers 51 includes: gripping the first workpiece by the second gripper 5, the first workpiece being coupled to the second workpiece by insertion; rotating the second gripper 5 gripping the first workpiece about the predetermined axis E; and moving the second gripper 5 rotating about the axis E in the direction of the axis E, thereby performing rotational insertion of coupling the first workpiece to the second workpiece.

With this configuration, the second fingers 51 gripping the first workpiece move straight in the direction of the axis E while rotating about the axis E to thereby couple the first workpiece to the second workpiece. Here, the second fingers 51 is opened and closed by the linkage 52. The linkage 52 includes movable portions and sliding portions. A clearance unique to the linkage 52 enables the second gripper 5 to adjust tilt or eccentricity of the first workpiece with respect to the second workpiece, albeit to some extent. With a combination of rotation of the first workpiece about the axis E and the adjustment function of tilt and eccentricity by the linkage 52, the first workpiece can be smoothly coupled to the second workpiece with coincidence of the axes of the first workpiece and the second workpiece to be coupled to each other by insertion.

The second hand H2 further includes the push actuator 9 that pushes the first workpiece released from gripping by the second gripper 5 in the direction of the axis E.

With this configuration, the first workpiece can be coupled to the second workpiece by moving the first workpiece gripped by the second gripper 5 straight in the direction of the axis E while rotating the first workpiece about the axis E, and in addition, the first workpiece can also be coupled to the second workpiece by pushing the first workpiece released from gripping by the second gripper 5 in the direction of the axis E by the push actuator 9. With an increase in the number of options of techniques for coupling the first workpiece to the second workpiece, the first workpiece can be smoothly coupled to the second workpiece.

In the robot system 1000, the second hand H2 further includes the push actuator 9 that pushes the first workpiece released from gripping by the second gripper 5 in the direction of the axis E, the controller 1200 causes the push actuator 9 to push the first workpiece in the direction of the axis E with the first workpiece released from gripping by the second gripper 5, thereby performing pushing coupling of coupling the first workpiece to the second workpiece, and the first workpiece is partially coupled to the second workpiece by rotational coupling and then is further coupled to the second workpiece.

A method for controlling the second hand H2 further includes: partially coupling the first workpiece to the second workpiece by the rotational coupling and then pushing the first workpiece in the direction of the axis E with the first workpiece released from gripping by the second gripper 5, thereby performing pushing coupling of coupling the first workpiece to the second workpiece.

With these configurations, after the first workpiece has been partially coupled to the second workpiece by rotational coupling, the first workpiece is further coupled to the second workpiece by pushing coupling. First, rotational coupling is performed so that tilt and eccentricity of the first workpiece are absorbed by the linkage 52, and the first workpiece can be partially coupled to the second workpiece. After the partial coupling of the first workpiece to the second workpiece, pushing coupling is performed so that the first workpiece is simply pushed to a constant direction and smoothly coupled to the second workpiece.

In addition, the controller 1200 alternately repeats the rotational coupling and the pushing coupling, thereby coupling the first workpiece to the second workpiece.

In the control method of the second hand H2, the rotational coupling and the pushing coupling are alternately repeated, thereby coupling the first workpiece to the second workpiece.

With these configurations, effects of rotational coupling and effects of pushing coupling are alternately obtained so that the first workpiece can be smoothly coupled to the second workpiece.

The straight-moving actuator 6 and the push actuator 9 are integrated. The straight-moving actuator 6 includes the shaft 82 extending in the direction of the axis E and having the distal end to which the second gripper 5 is coupled, and the fourth motor 61 (driver) that moves the shaft 82 straight in the direction of the axis E. The push actuator 9 includes the pushing block 91 (pusher) disposed at the distal end of the shaft 82, and pushes the first workpiece by the pushing block 91.

With this configuration, the straight-moving actuator 6 includes the shaft 82 that is caused to move straight by the fourth motor 61 in the direction of the axis E, and the second gripper 5 is coupled to the distal end of the shaft 82. The pushing block 91 of the push actuator 9 is disposed at the distal end of the shaft 82. Accordingly, the straight-moving actuator 6 causes not only the second gripper 5 to move in the direction of the axis E but also the pushing block 91 to move in the direction of the axis E. In the manner described above, the straight-moving actuator 6 and the push actuator 9 are integrally formed so that the driver and the driving mechanism of the push actuator 9 can be omitted or simplified, and thereby, the entire configuration of the second hand H2 can be simplified.

The second hand H2 further includes the damper 10 that elastically supports the second gripper 5 in the direction of the axis E.

With this configuration, in gripping the first workpiece by the second gripper 5 or coupling the first workpiece gripped by the second gripper 5 to the second workpiece, an impact or a force exerted on the second gripper 5 in the direction of the axis E can be absorbed by the damper 10. As a result, secure gripping of the first workpiece and smooth joint of the first workpiece to the second workpiece can be achieved.

In a case where insertion coupling is screwing, the damper 10 absorbs a difference in the amount of movement in the direction of the axis E between the second gripper 5 and the first workpiece caused by a difference between the amount of movement of the second gripper in the direction of the axis E per one turn about the axis E by the straight-moving actuator 6 and the rotation actuator 7 and the screw pitch of the first workpiece.

With this configuration, in the case where the feed pitch is different from the pitch of screws of the first workpiece, the damper 10 is elastically deformed to adjust the amount of movement of the second gripper 5 in the direction of the axis E such that the amount of movement of the second gripper 5 in the direction of the axis E is equal to the amount of movement of the first workpiece in the direction of the axis E. As a result, the first workpiece can be smoothly coupled to the second workpiece by screwing.

The linkage 52 includes the links 53 coupled to the second fingers 51. The links 53 are disposed at the inner side of the three second fingers 51 in the radial direction about the axis E.

With this configuration, since the links 53 are disposed at the inner side of the three second fingers 51 in the radial direction about the axis E, dimensions of the second gripper 5, especially the dimension in the radial direction about the axis E, can be reduced. Accordingly, the second gripper 5 can enter narrow space for work.

The second gripper 5 grips the first workpiece with the axis E located at a center of gripping.

With this configuration, the second gripper 5 can perform positioning of the workpiece in gripping the workpiece.

The second gripper 5 includes the three second fingers 51.

With this configuration, the second gripper 5 can grip the first workpiece with the three second fingers 51. In the case of gripping the first workpiece with the three second fingers 51, the first workpiece can be gripped more firmly than in the case of gripping the workpiece with two fingers.

OTHER EMBODIMENTS

In the foregoing section, the embodiment has been described as an example of the technique disclosed in the present application. The technique disclosed here, however, is not limited to this embodiment, and is applicable to other embodiments obtained by changes, replacements, additions, and/or omissions as necessary. Components described in the embodiment described above may be combined as a new exemplary embodiment. Components provided in the accompanying drawings and the detailed description can include components unnecessary for solving problems as well as components necessary for solving problems in order to exemplify the technique. Therefore, it should not be concluded that such unnecessary components are necessary only because these unnecessary components are included in the accompanying drawings or the detailed description.

For example, the hand 100 may be incorporated in a device other than the robot 1100.

Although the hand 100 includes the first hand H1 and the second hand H2, the hand 100 may not include the first hand H1.

Although the straight-moving actuator 6 and the rotation actuator 7 are integrated in the second hand H2, the present disclosure is not limited to this example. The straight-moving actuator 6 and the rotation actuator 7 may be separated from each other. Although the push actuator 9 is integrated with the straight-moving actuator 6, the push actuator 9 may be separated from the straight-moving actuator 6.

The number of the second fingers 51 is not limited to three, and at least two second fingers 51 are sufficient.

In fitting included in insertion coupling, fitting of the bearing holder 230 and the angle 220 and fitting of the shaft 250 and the bearing 235 are merely examples, and other workpieces may be fitted together. In regard to screwing included in insertion coupling, screwing of the bolt 240 to the base plate 210 and screwing of the bolt 240 to the angle 220 are merely examples, and other workpieces may be screwed. In regard to insertion coupling, the foregoing description is directed to the example in which a workpiece to be inserted, that is, an inner workpiece in the insertion coupling, is the first workpiece, but the present disclosure is not limited to this example. The first workpiece, that is, the workpiece gripped by the gripper, may be an outer workpiece. For example, the technique of this disclosure is also applicable to the case of gripping a workpiece having an internal thread by the second gripper 5 and coupling the workpiece to another workpiece having an external thread, such as a bolt. Alternatively, the technique of this disclosure is also applicable to the case of gripping a cylindrical workpiece by the second gripper 5 and fitting the cylindrical workpiece to a columnar workpiece.

The invention claimed is:

1. A hand that grips a first workpiece and couples the first workpiece to a second workpiece, the first workpiece and the second workpiece being to be coupled to each other by insertion, the hand comprising:

a gripper that grips the first workpiece;

a straight-moving actuator that causes the gripper to move straight in a direction of a predetermined axis; and a rotation actuator that rotates the gripper about the axis, wherein the gripper includes at least two fingers that grip the first workpiece and a linkage that opens and closes the at least two fingers.

2. The hand according to claim 1, further comprising:

a push actuator that pushes the first workpiece released from gripping by the gripper in the direction of the axis.

3. The hand according to claim 2, wherein the straight-moving actuator and the push actuator are integrated, the straight-moving actuator includes a shaft extending in the direction of the axis and having a distal end to which the gripper is coupled, and a driver that moves the shaft straight in the direction of the axis, and the push actuator includes a pusher disposed at the distal end of the shaft and pushes the first workpiece by the pusher.

4. The hand according to claim 1, further comprising a damper that elastically supports the gripper in the direction of the axis.

5. The hand according to claim 4, wherein in a case where the insertion coupling is screwing, the damper absorbs a difference in an amount of movement in the direction of the axis between the gripper and the first workpiece caused by a difference between an amount of movement of the gripper in the direction of the axis per one turn about the axis by the straight-moving actuator and the rotation actuator and a screw pitch of the first workpiece.

6. The hand according to claim 1, wherein the linkage includes links coupled to the at least two fingers, and the links are disposed at an inner side of the at least two fingers in a radial direction about the axis.

7. The hand according to claim 1, wherein the gripper grips the first workpiece with the axis located at a center of gripping.

8. The hand according to claim 1, wherein the gripper includes three fingers.

9. A robot system that couples a first workpiece to a second workpiece, the first workpiece and the second workpiece being to be coupled to each other by insertion, the robot system comprising:

a hand; and a controller that controls the hand, wherein the hand includes a gripper that grips the first workpiece, a straight-moving actuator that moves the gripper straight in a direction of a predetermined axis, and a rotation actuator that rotates the gripper about the axis, the gripper includes at least two fingers that grip the first workpiece and a linkage that opens and closes the at least two fingers, and the controller moves the gripper gripping the first workpiece straight in the direction of the axis by the straight-moving actuator while rotating the gripper about the axis by the rotation actuator, thereby performing rotational coupling of coupling the first workpiece to the second workpiece.

10. The robot system according to claim 9, further comprising the hand further includes a push actuator that pushes the first workpiece released from gripping by the gripper in the direction of the axis, the controller causes the push actuator to push the first workpiece in the direction of the axis with the first workpiece released from gripping by the gripper, thereby performing pushing coupling of coupling the first workpiece to the second workpiece, and the first workpiece is partially coupled to the second workpiece by the rotational coupling, and then is further coupled to the second workpiece by the pushing coupling.

11. The robot system according to claim 10, wherein the controller alternately repeats the rotational coupling and the pushing coupling, thereby coupling the first workpiece to the second workpiece.

12. The robot system according to claim 10, wherein the straight-moving actuator and the push actuator are integrated, the straight-moving actuator includes a shaft extending in the direction of the axis and having a distal end to which the gripper is coupled, and a driver that moves the shaft straight in the direction of the axis, and the push actuator includes a pusher disposed at the distal end of the shaft and pushes the first workpiece by the pusher.

13. The robot system according to claim 9, further comprising a damper that elastically supports the gripper in the direction of the axis.

14. The robot system according to claim 13, wherein in a case where the insertion coupling is screwing, the damper absorbs a difference in an amount of movement in the direction of the axis between the gripper and the first workpiece caused by a difference between an amount of movement of the gripper in the direction of the axis per one turn about the axis by the straight-moving actuator and the rotation actuator and a screw pitch of the first workpiece.

15. A control method of a hand including at least two fingers that grip a workpiece and a linkage that opens and closes the at least two fingers, the control method comprising:

gripping a first workpiece by the hand, the first workpiece being to be coupled to a second workpiece by insertion coupling;

rotating the hand gripping the first workpiece about a predetermined axis; and moving the hand rotating about the axis straight in the direction of the axis, thereby performing rotational coupling of coupling the first workpiece to the second workpiece.

16. The control method according to claim 15, further comprising partially coupling the first workpiece to the second workpiece by the rotational coupling and then pushing the first workpiece in the direction of the axis with the first workpiece released from gripping by the hand, thereby performing pushing coupling of coupling the first workpiece to the second workpiece.

17. The control method according to claim 16, wherein the rotational coupling and the pushing coupling are alternately repeated, thereby coupling the first workpiece to the second workpiece.

* * * * *